United States Patent
Goto

(10) Patent No.: US 8,814,340 B2
(45) Date of Patent: *Aug. 26, 2014

(54) IMAGE FORMING METHOD, AND IMAGE FORMED MATTER

(75) Inventor: Hiroshi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

This patent is subject to a terminal disclaimer.

(21) Appl. No.: 13/388,074

(22) PCT Filed: Aug. 10, 2010

(86) PCT No.: PCT/JP2010/063788
§ 371 (c)(1),
(2), (4) Date: Jan. 31, 2012

(87) PCT Pub. No.: WO2011/021591
PCT Pub. Date: Feb. 24, 2011

(65) Prior Publication Data
US 2012/0128949 A1 May 24, 2012

(30) Foreign Application Priority Data

Aug. 21, 2009 (JP) ................................. 2009-191612

(51) Int. Cl.
*B41J 2/01* (2006.01)
*B41M 5/00* (2006.01)
*B41J 2/21* (2006.01)
*B41M 7/00* (2006.01)
*C09D 11/00* (2014.01)

(52) U.S. Cl.
CPC ............ *B41M 5/0017* (2013.01); *B41J 2/2107* (2013.01); *B41M 7/0018* (2013.01); *C09D 11/322* (2013.01); *C09D 11/38* (2013.01); *C09D 11/54* (2013.01)
USPC ................ 347/100; 347/95; 347/96

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101

USPC ......... 347/100, 95, 96, 101, 102, 105, 21, 20; 106/31.6, 31.27, 31.13; 523/160, 161
See application file for complete search history.

(56) References Cited

U.S. PATENT DOCUMENTS 6,001,466 A * 12/1999 Noguchi et al. ............... 347/105
6,142,618 A * 11/2000 Smith et al. ...................... 347/85

(Continued)

FOREIGN PATENT DOCUMENTS

JP 2860123 12/1998
JP 2004 330568 11/2004

(Continued)

OTHER PUBLICATIONS

International Search Report Issued Sep. 14, 2010 in PCT/JP10/63788 Filed Aug. 10, 2010.

(Continued)

*Primary Examiner* — Manish S Shah
(74) *Attorney, Agent, or Firm* — Oblon, Spivak, McClelland, Maier & Neustadt, L.L.P.

(57) ABSTRACT

An image forming method including: applying a pre-treatment liquid onto a coating layer provided on at least one surface of a support of a recording medium, jetting an inkjet ink onto the coating layer, onto which the pre-treatment liquid has been applied, so as to form an image, and applying or jetting a post-treatment liquid onto the coating layer, onto which the inkjet ink has been jetted, so as to form a transparent protective layer on the coating layer, wherein the inkjet ink contains the water-dispersible colorant, a water-soluble organic solvent, a surfactant, a penetrant and water, and wherein an amount of pure water transferred into the recording medium, provided with the coating layer, measured at a contact time of 100 ms with a dynamic scanning liquid absorptometer is 1 ml/m² to 10 ml/m², and the pre-treatment liquid contains a water-soluble aliphatic organic acid.

19 Claims, 1 Drawing Sheet

(56) References Cited

U.S. PATENT DOCUMENTS

| | | | |
|---|---|---|---|
| 6,196,674 B1* | 3/2001 | Takemoto | 347/103 |
| 6,283,589 B1* | 9/2001 | Gelbart | 347/101 |
| 6,293,668 B1* | 9/2001 | Kubby et al. | 347/101 |
| 6,439,708 B1* | 8/2002 | Kato et al. | 347/100 |
| 7,246,896 B2* | 7/2007 | Askeland et al. | 347/100 |
| 7,919,544 B2 | 4/2011 | Matsuyama et al. | |
| 2002/0180855 A1* | 12/2002 | Kasperchik et al. | 347/98 |
| 2003/0068571 A1* | 4/2003 | Uehara et al. | 347/101 |
| 2005/0225618 A1 | 10/2005 | Askeland et al. | |
| 2005/0243121 A1* | 11/2005 | Onishi | 347/106 |
| 2006/0023042 A1* | 2/2006 | Doi | 347/100 |
| 2007/0188571 A1* | 8/2007 | Tokita et al. | 347/100 |
| 2007/0197685 A1 | 8/2007 | Aruga et al. | |
| 2008/0233363 A1 | 9/2008 | Goto | |
| 2009/0098312 A1 | 4/2009 | Goto et al. | |
| 2009/0176070 A1 | 7/2009 | Goto et al. | |
| 2010/0196601 A1 | 8/2010 | Goto et al. | |
| 2010/0196602 A1 | 8/2010 | Koyano et al. | |
| 2010/0295891 A1 | 11/2010 | Goto et al. | |

FOREIGN PATENT DOCUMENTS

| | | | |
|---|---|---|---|
| JP | 3918564 | 2/2007 | |
| JP | 2007 144975 | 6/2007 | |
| JP | 2008 100511 | 5/2008 | |
| JP | 2009 107256 | 5/2009 | |
| WO | 03 043825 | 5/2003 | |
| WO | WO 2008114849 A1 * | 9/2008 | B41J 2/01 |
| WO | 2009/091079 A1 | 7/2009 | |

OTHER PUBLICATIONS

Notification of Second Office Action issued Mar. 11, 2014, in Chinese Patent Application No. 201080037164.1 filed Aug. 10, 2010 (with English translation).

* cited by examiner

IMAGE FORMING METHOD, AND IMAGE FORMED MATTER

TECHNICAL FIELD

The present invention relates to an image forming method that enables recoating high quality images close to those obtained by commercial printing such as offset printing by an inkjet system, and also relates to image formed matters using the image forming method.

BACKGROUND ART

Inkjet recording methods have become rapidly popular in these days because of their capability of easy recording of color images and advantages of low running costs. However, the inkjet recording methods have problems that image defects typified by character feathering easily occur depending on the combination of an ink with a recording medium used, which leads to large degradation in image quality.

For example, when a coated paper using, as a coating layer material, a filler which is inexpensive and has high concealability and a relatively small amount of absorption, such as calcium carbonate and kaolin, like coated paper for commercial printing or publication printing, is used as an inkjet recording medium, the resulting image sometimes suffers from ink bleeding and insufficient image density. This is because, unlike inkjet exclusive recording paper, coated paper is not designed to absorb a large amount of ink for a short time, and thus such ink feathering results from absorption delay, and even if ink is absorbed into a coating layer of the coated paper, a coloring material of the ink is concealed by a filler having high concealability like kaolin, which is contained in the coating layer. Accordingly, it has been believed that paper of this type is not suitable for inkjet recording.

Meanwhile, with respect for inkjet inks, in recent years, attention has been focused on aqueous pigment inks, in which a pigment serving as a coloring material is formed into fine particles and dispersed in water, in terms of their high image density, high storage stability after recording and their high waterfastness. Pigments of this type are now expected that the texture of prints can be made closer to those of commercial prints, because the composition of the coloring material is similar to those used in general commercial printing. However, when a pigment ink is used to perform recording on a coated paper for commercial printing or publish printing, the following problems arise: the coated paper suffers from ink absorption delay and causes image bleeding, the ink is not fixed after being dried, and the formed image does not exhibit glossiness.

To solve the above-mentioned problems, there has been proposed a recording method in which a combination of a pigment ink having high permeability with a recording medium having low ink absorptivity is used (see PTL 1). According to this proposed recording method, a small amount of a pigment ink having ultra-high permeability is used to be printed on a recording medium provided with a coating layer designed to suppress ink absorption properties (permeability) so as not for the coloring material in the ink to penetrate therethrough as much as possible. By making only solvents (water and organic solvent) forming the ink selectively penetrate through recording medium, only the coloring material (pigment) is efficiently retain on the surface of the recording medium without using a specific material like a cationic fixing agent. In addition, since a sufficient image density can be obtained with a small amount of ink, superior ink dryness can be obtained. Further, by making the pigment in the ink retain on the surface of the recording medium, the transparency of layers in the recording medium that the conventional recording media are required to have as a necessary function has become indispensable.

Meanwhile, when commercial printing or publish printing is performed, in most of cases, at least several hundreds sheets to several thousands sheets of paper are necessary to be output at a time, and also, printers are required to continuously and stably output images without image defects. When an inkjet printer is used for such purposes, what is really acknowledged as a problem is images streaks nozzle clogging due to dry of ink and due to bended ejection angles of nozzles, caused by adhesion of dried ink around the nozzles. The most effective method to prevent this phenomenon is to add a water-soluble organic solvent having a high boiling point in ink, thereby preventing the ink from being drying.

Here, in the method discussed in PTL 1, when a combination of a recording medium having extremely low ink absorption as seen in commercial printing paper with an ink into which a water-soluble organic solvent, which is highly efficient in preventing printer heads from drying (nozzle clogging) and having a high boiling point, is used, there is a disadvantage that it takes a long time to not have ink bleeding (called "ink adhesion") even if the ink looks dried and the recording medium is rubbed. This is because a coloring material remaining on a surface layer of the recording medium is wetted for long hours with containing a small amount of a wetting agent. This phenomenon similar to that of the case where an offset ink using a soybean oil needs to have long hours until it is fixed after being printed. Therefore, when an inkjet recording is performed for the purpose of commercial printing according to the method disclosed in PTL 1, it takes a long time to be fixed on a recording medium, and the method is inferior in convenience, for example, prints are intended to be distributed as flier or catalogue shortly after printing, the method cannot be respond to the need.

In order to improve the dryness and fixability of inkjet recorded matters immediately after being printed, it is proposed to use a heating roller as a drying auxiliary unit to dry such inkjet recording matters (see PTL 2). However, in the case of using an inkjet recording method, when a printed matter is dried by heating, a large amount of water contained in an ink becomes water vapor to fill in the machine, easily causing problems such as condensation, bite (corrosion), and the like.

CITATION LIST

Patent Literature

[PTL 1] Japanese Patent Application Laid-Open (JP-A) No. 2007-144975
[PTL 2] Japanese Patent (JP-B) No. 2860123

SUMMARY OF INVENTION

Technical Problem

The present invention aims to provide an ideal image forming method which enables full-color-image recording at high speed with high quality with respect to commercial printing paper and which is superior in abrasion resistance of recorded matter, and to provide an image formed matter.

Solution to Problem

Means for solving the above-mentioned problems are as follows:

<1> An image forming method including:

applying a pre-treatment liquid having a property of causing a water-dispersible colorant to aggregate onto a surface of a coating layer which is provided on at least one surface of a support of a recording medium, jetting an inkjet ink onto the surface of the coating layer, onto which the pre-treatment liquid has been applied, so as to form an image, and applying or jetting a post-treatment liquid onto the surface of the coating layer, onto which the inkjet ink has been jetted, so as to form a transparent protective layer on the coating layer, wherein the inkjet ink contains the water-dispersible colorant, a water-soluble organic solvent, a surfactant, a penetrant and water, and wherein an amount of pure water transferred into a surface of the recording medium, the surface being provided with the coating layer, measured at a contact time of 100 ms with a dynamic scanning liquid absorptometer is 1 ml/m² to 10 ml/m², and the pre-treatment liquid contains a water-soluble aliphatic organic acid.

<2> The image forming method according to <1> above, wherein the number of carbon atoms of the water-soluble aliphatic organic acid is 2 to 6.

<3> The image forming method according to one of <1> and <2> above, wherein the water-soluble aliphatic organic acid is at least one selected from compounds each represented by any one of the following General Formulae (I) to (III):

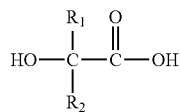

General Formula (I)

in General Formula (I), $R_1$ represents a hydrogen atom or a methyl group substituted by a hydroxyl group or carboxyl group; and $R_2$ represents a methyl group or a methyl group substituted by a hydroxyl group or carboxyl group,

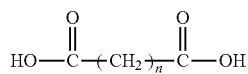

General Formula (II)

in General Formula (II), n is an integer of 0 to 4,

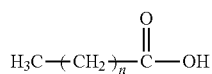

General Formula (III)

in General Formula (III), n is an integer of 0 to 4.

<4> The image forming method according to any one of <1> to <3> above, wherein the pre-treatment liquid further contains a water-soluble organic monoamine compound.

<5> The image forming method according to <4>, wherein the water-soluble organic monoamine compound is at least one selected from compounds each represented by the following General Formulae (IV) and (V):

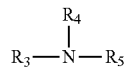

General Formula (IV)

in General Formula (IV), $R_3$, $R_4$, and $R_5$ each represent a hydrogen atom, an alkoxy group having 1 to 4 carbon atoms, an alkyl group having 1 to 8 carbon atoms, a hydroxyethyl group or a hydroxypropyl group (with the proviso that the compound where all of $R_3$, $R_4$, and $R_5$ are hydrogen atoms is excluded),

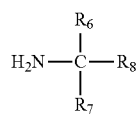

General Formula (V)

in General Formula (V), $R_6$ represents a hydroxymethyl group; $R_7$ represents a methyl group, ethyl group or hydroxymethyl group; $R_8$ represents a hydrogen atom, an alkyl group having 1 to 4 carbon atoms or a hydroxymethyl group.

<6> The image forming method according to any one of <1> to <5> above, wherein a static surface tension of the pre-treatment liquid is 30 mN/m or lower.

<7> The image forming method according to any one of <1> to <6> above, wherein the water-dispersible organic colorant is a pigment, and the pigment is at least one selected from an anionic self-dispersible pigment and a pigment coated with an anionic resin.

<8> The image forming method according to any one of <1> to <7> above, wherein a static surface tension of the inkjet ink is 30 mN/m or lower.

<9> The image forming method according to any one of <1> to <8> above, wherein the post-treatment liquid contains a thermoplastic resin.

<10> The image forming method according to <9> above, wherein the thermoplastic resin is a water-dispersible resin, and the water-dispersible resin has a glass transition temperature (Tg) of −30° C. or higher and a minimum film forming temperature (MFT) of 50° C. or lower.

<11> The image forming method according to <10> above, wherein the water-dispersible resin is at least one selected from the group consisting of acrylic resins, styrene-acrylic resins, urethane resins, acryl-silicone resins, and fluorine resins.

<12> The image forming method according to any one of <1> to <11> above, wherein a dry adhesion amount of the post-treatment liquid to the recording medium is 0.5 g/m² to 10 g/m².

<13> The image forming method according to any one of <1> to <12> above, further including: heating the recording medium, onto which surface the post-treatment liquid has been applied or jetted, at 100° C. to 150° C. by a heating unit so that the inkjet ink is thermally fixed on the recording medium.

<14> An image formed matter formed by the image forming method according to any one of <1> to <13>.

Advantageous Effects of Invention

According to the present invention, it is possible to solve the above-mentioned conventional problems, to achieve the above-mentioned object, to provide an ideal image forming method which enables full-color recording of high-quality images on commercial printing paper at a high speed and which is excellent in abrasion resistance on: ink prints, and to provide an image formed matters.

DESCRIPTION OF EMBODIMENTS (Image Forming Method)

Figure 1:
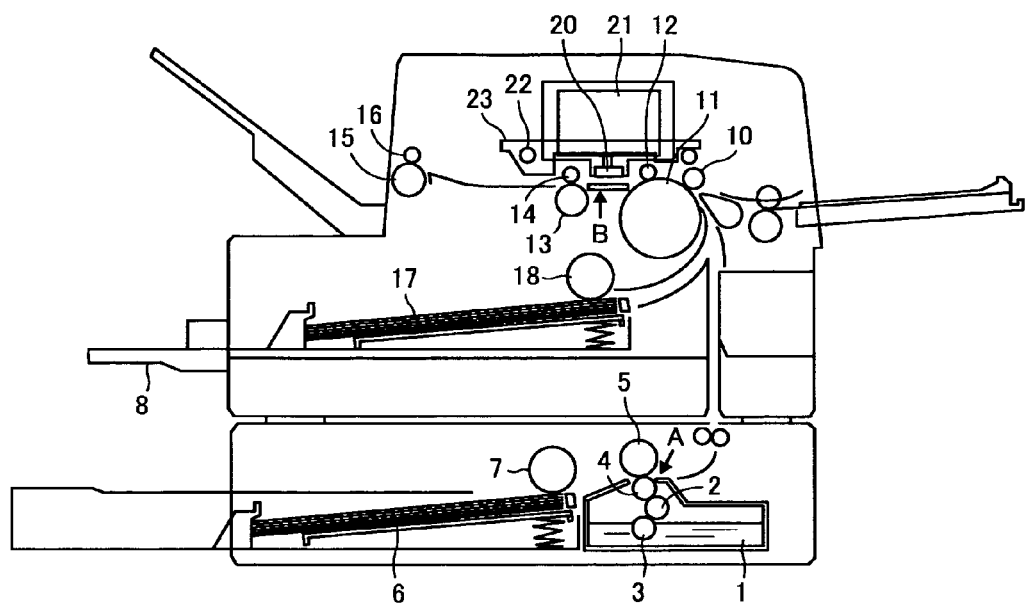
FIG. 1 is a schematic construction diagram illustrating the entire construction of an inkjet recording apparatus.

An image forming method according to the present invention includes a pre-treatment step, an ink-jetting step, and a post-treatment step, and further includes other steps as required.

<Pre-Treatment Step>

The pre-treatment step is a step of applying a pre-treatment liquid having a property of causing a water-dispersible colorant to aggregate onto a surface of a coating layer which is provided on at least one surface of a support of a recording medium.

The pre-treatment step is not particularly limited, and a coating method capable of uniformly applying the pre-treatment liquid to a surface of printing paper may be employed. Examples of such a coating method include blade coating method, gravure coating method, gravure offset coating method, bar coating method, roll coating method, knife coating method, air-knife coating method, comma coating method, U-comma coating method, AKKU coating method, smooth coat method, micro-gravure coating method, reverse roll coating method, four-roll or five-roll coating method, dip coating method, curtain coating method, slide coating method, and dye coating method.

The pre-treatment may be carried out on a printing paper whose surface is sufficiently dry or on a printing paper whose surface is being dried, since the effect of the pre-treatment can be exhibited. Note that the printing paper that has been subjected to the pretreatment may be dried if necessary. In this case, the printing paper may be dried by a roll heater, drum heater, or hot air.

A wet coating amount of the pre-treatment liquid to a print paper, in the pre-treatment step, is preferably 0.1 g/m² to 30.0 g/m², and more preferably 0.2 g/m² to 10.0 g/m². When the wet coating amount is less than 0.1 g/m², almost no improvement in image quality (image density, color saturation, beading resistance and color bleeding resistance) may not be observed. When the wet coating amount is more than 30.0 g/m², the dryness of the pre-treatment liquid degrades, which may cause paper curling.

<<Pre-Treatment Liquid>>

—Water-Soluble Aliphatic Organic Acid—

The pre-treatment liquid for use in the image forming method according to the embodiment contains a water-soluble aliphatic organic acid and has a property to aggregate water-dispersible colorants. Here, the description "aggregate" means that water-dispersible colorant particles are adsorbed to each other to come together. This phenomenon can be confirmed using a particle size distribution measuring device. When an ion material such as a water-soluble aliphatic organic acid is added to the pre-treatment liquid, the ions are adsorbed to surface electric charges of the water-dispersible colorant, whereby the surface electric charges are neutralized and an aggregation effect is reinforced by inter molecular attraction forces, thus making it possible to make the water-dispersible colorant aggregate. As an example of the method of confirming the aggregation of the water-dispersible colorant, there may be exemplified a method in which whether or not colorant particles aggregate is confirmed instantly when 30 ml of the pre-treatment liquid is added to 5 µl of an inkjet ink containing 5% by mass of a water-dispersible colorant.

As the water-soluble aliphatic organic acid, a carboxyl group-containing-water-soluble aliphatic organic acid and a sulfo group-containing-water-soluble aliphatic organic acid are preferably used. Here, the term "aliphatic" means that a straight-chain or branched hydrocarbon group is contained, and the hydrocarbon group may be a saturated hydrocarbon group and may be a unsaturated hydrocarbon group. The number of carbon atoms in the water-soluble aliphatic organic acid is not particularly limited. It is, however, in terms of the solubility in solvents, preferably 2 to 6 per molecule, and more preferably 2 to 4 per molecule. The number of acid groups in the water-soluble aliphatic organic acid is, in terms of the image density, preferably 3 or less per molecule, more preferably 2 or less per molecule, and still more preferably 1 per molecule. As the water-soluble aliphatic organic acid, a carboxyl group-containing-water-soluble aliphatic organic acid represented by any one of the following General Formulae (I) to (III) is preferably used.

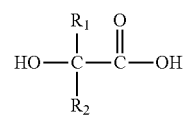

General Formula (I)

In General Formula (I), $R_1$ represents a hydrogen atom or a methyl group substituted by a hydroxyl group or carboxyl group; and $R_2$ represents a methyl group or a methyl group substituted by a hydroxyl group or carboxyl group.

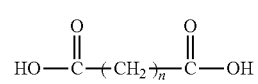

General Formula (II)

In General Formula (II), n is an integer of 0 to 4, more preferably an integer of 0 to 2.

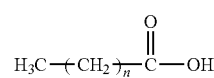

General Formula (III)

In General Formula (III), n is an integer of 0 to 4, more preferably an integer of 0 to 2.

Examples of compounds represented by General Formula (I) include lactic acid (pKa: 3.83), malic acid (pKa: 3.4), citric acid (pKa: 3.13), and tartaric acid (pKa: 2.93). Examples of compounds represented by General Formula (II) include oxalic acid (pKa: 1.04), malonic acid (pKa: 2.05), succinic acid (pKa: 4.21), and adipic acid (pKa: 4.42). Examples of compounds represented by General Formula (III) include acetic acid (pKa: 4.76), propionic acid (pKa: 4.87), butyric acid (pKa: 4.82), and valeric acid (pKa: 4.82). Examples of the water-soluble aliphatic organic acids other than those represented by any one of General Formulae (I) to (III) include gluconic acid (pKa: 2.2), pyruvic acid (pKa: 2.49), and fumaric acid (pKa: 3.02).

As the sulfo group-containing-water-soluble aliphatic organic acid, taurine is preferably used.

The amount of the water-soluble aliphatic organic acid in the total amount of the pre-treatment liquid is preferably 1% by mass to 40% by mass, and more preferably 3% by mass to 30% by mass. When the addition amount is more than 40% by mass, it may be difficult to add water-soluble organic monoamine in an amount required for neutralization due to the formulation of the pre-treatment liquid. When the addition amount is less than 1% by mass, the effect of improving image quality may be reduced.

—Water-Soluble Organic Monoamine Compound—

The pre-treatment liquid preferably contains a water-soluble organic monoamine compound with a view to control the permeability of ink and to prevent corrosion of metal. The water-soluble organic monoamine compound may be one of primary, secondary, tertiary, quaternary amines and salts thereof. Note that in the embodiment, the term "quaternary amine" means a compound in which a nitrogen atom is substituted with four alkyl groups. The number of carbon atoms in the water-soluble organic monoamine compound is not particularly limited, however, it is preferably, in terms of the solubility in solvents, 2 to 12 per molecule, and more preferably 2 to 6 per molecule.

As the water-soluble organic monoamine compound, a compound represented by one of the following General Formulae (VI) and (V) is preferably used.

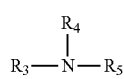

General Formula (IV)

In General Formula (IV), $R_3$, $R_4$, and $R_5$ each represent a hydrogen atom, an alkoxy group having 1 to 4 carbon atoms, an alkyl group having 1 to 8 carbon atoms, a hydroxyethyl group or a hydroxypropyl group (with the proviso that the compound where all of $R_3$, $R_4$, and $R_5$ are hydrogen atoms is excluded),

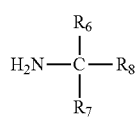

General Formula (V)

In General Formula (V), $R_6$ represents a hydroxymethyl group; $R_7$ represents a methyl group, ethyl group or hydroxymethyl group; $R_8$ represents a hydrogen atom, an alkyl group having 1 to 4 carbon atoms or a hydroxymethyl group.

Examples of compounds represented by General Formula (IV) include dimethylamine, ethylamine, diethylamine, triethylamine, propylamine, dipropylamine, isopropylamine, diisopropylamine, n-butylamine, t-butylamine, sec-butylamine, di-n-butylamine, tributylamine, pentylamine, dipentylamine, tripentylamine, 2-ethylhexylamine, di-2-ethylhexylamine, di-n-octylamine, tri-n-octylamine, 1-amino-2-propanol, 3-amino-1-propanol, N-methylethanolamine, N,N-diethylethanolamine, N,N-dimethylethanolamine, N-methyldiethanoamine, diethanoamine, triethanolamine, triisopropanolamine, N-butyldiethanolamine, and N,N-dibutylethanolamine.

Examples of compounds represented by General Formula (V) include 2-amino-2-ethyl-1,3-propanediol, 2-amino-2-(hydroxymethyl)-1,3-propanediol, 2-amino-2-methyl-1,3-propanediol, and 2-amino-2-methyl-1-propanol.

Examples of the water-soluble organic monoamine compound other than those represented by one of General Formulae (IV) and (V) include allylamine, diallylamine, 3-ethoxypropylamine, 2-(2-aminoethoxy)ethanol, 3-methoxypropylamine, and choline.

The addition amount of the water-soluble organic monoamine compound is preferably 1.0 mol to 1.5 mol, and more preferably 1.0 mol to 1.2 mol relative to 1 mol of the acid group possessed by the water-soluble aliphatic organic acid. When the addition amount of the water-soluble organic monoamine compound is less than 1.0 mol relative to 1 mol of the acid group possessed by the water-soluble aliphatic organic acid, white streaks may occur due to narrowed dots of image formed matter. When the addition amount of the water-soluble organic monoamine compound is more than 1.5 mol, the water-soluble monoamine compound released in the pre-treatment liquid may accelerate permeation of the inkjet ink to cause a decrease in image density. Since the water-soluble organic amine compound is necessary for producing a salt neutralized together with the organic acid and it is important for the pre-treatment liquid to have a pH of 5 or higher, it is necessary to suitably control the amount of the water-soluble organic amine compound according to the molecular weight of the water-soluble organic monoamine compound or the water-soluble aliphatic organic acid.

—Water-Soluble Organic Solvent—

The pre-treatment liquid preferably contains a water-soluble organic solvent with a view to control the permeability of ink and to prevent corrosion of metal. Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate. The water-soluble organic solvents retain a large amount of water therein even when left at rest in the open air, thereby imparting flowability to the pre-treatment liquid. In this case, by using a water-soluble organic solvent having a high equilibrium water content as the water-soluble organic solvent, it is possible to prevent an excessive increase in, viscosity of the ink even when the water in the pre-treatment liquid evaporates and reaches an equilibrium state.

Examples of a water-soluble organic solvent having a high-equilibrium water content include water-soluble organic solvents having an equilibrium water content of 30% by mass or more, more preferably 40% by mass under the environment of 23° C. and 80% RH (hereinafter, referred to as "water-soluble organic solvent A"). Note that the term "equilibrium water content" means a water content when a mixture of a water-soluble organic solvent and water is released into the air at a certain temperature and a certain humidity, and the evaporation of water in the solution and absorption of water in the air into the water-soluble organic solvent is in an equilibrium state. More specifically, an equilibrium water content can be measured using a potassium chloride-saturated aqueous solution and a desiccator. The internal temperature of the desiccator is maintained at 23° C.±1° C. and the internal humidity thereof is maintained at 80%±3%. Then, each sample of aqueous organic solvents is weighed 1 g and poured in a petri dish, and the petri dish is placed in the desiccator and stored until the time there is no more change in mass of the sample, and an equilibrium water content of the sample can be determined by the following equation, based on the measured amount of water absorbed into organic solvent.

Equilibrium Water Content(%)=Amount of water absorbed into organic solvent/(Amount of organic solvent+Amount of water absorbed into organic solvent)×100

As a water-soluble organic solvent A preferably used in the embodiment, polyhydric alcohols having an equilibrium water content of 30% by mass or more under the environment of 23° C. and 80% RH are exemplified. Specific examples of such water-soluble organic solvent A include 1,2,3-butanetriol (bp175° C./33 hPa, 38% by mass), 1,2,4-butanetriol (bp190° C.–191° C./24 hPa, 41% by mass), glycerin(bp290° C., 49% by mass), diglycerin (bp270° C./20 hPa, 38% by mass), triethylene glycol (bp285° C., 39% by mass), tetraethylene glycol (bp324° C.–330° C., 37% by mass), diethylene glycol (bp245° C., 43% by mass), and 1,3-butanediol (bp203° C.–204° C., 35% by mass). Among these, glycerin and 1,3-butanediol are particularly preferably used because when these materials contain water, the viscosity of these substances decreases, and the pigment dispersion can be stably maintained without aggregation. It is desirable to use the water-soluble organic solvent A in an amount of 50% by mass or more relative to the total amount of the water-soluble organic solvents used, because the ejection stability can be secured, and the resulting ink is excellent in preventing adhesion of waste ink to instruments used to maintain the ink ejection apparatus.

The pre-treatment liquid may be used in combination with an water-soluble organic solvent having an equilibrium water content less than 30% by mass under the environment of 23° C. and 80% RH (hereinafter, called "water-soluble organic solvent B"), instead of a part of or in addition to the water-soluble organic solvent A. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other water-soluble organic solvents.

Specific examples of the polyhydric alcohols include dipropylene glycol (bp232° C.), 1,5-pentanediol (bp242° C.), 3-methyl-1,3-butanediol (bp203° C.), propylene glycol (bp187° C.), 2-methyl-2,4-pentanediol (bp197° C.), ethylene glycol (bp196° C.-198° C.), tripropylene glycol (bp267° C.), hexylene glycol to (bp197° C.), polyethylene glycol (viscosity-controlled liquid to solid), polypropylene glycol (bp187° C.), 1,6-hexanediol (bp253° C.-260° C.), 1,2,6-hexanetriol (bp178° C.), trimethylolethane (solid, mp199° C.–201° C.), and trimethylolpropane (solid, mp61° C.).

Examples of the polyhydric alcohol alkyl ethers include ethylene glycol monoethylether (bp135° C.), ethylene glycol monobutylether (bp171° C.), diethylene glycol monomethylether (bp194° C.), diethylene glycol monoethylether (bp197° C.), diethylene glycol monobutylether (bp231° C.), ethylene glycol mono-2-ethylhexylether (bp229° C.), and propylene glycol monoethylether (bp132° C.). Examples of the polyhydric alcohol aryl ethers include ethylene glycol monophenyl ether (bp237° C.), and ethylene glycol monobenzyl ether.

Examples of the nitrogen-containing heterocyclic compounds include 2-pyrrolidone (bp250° C., mp25.5° C., 47% by mass-48% by mass), N-methyl-2-pyrrolidone (bp202° C.), 1,3-dimethyl-2-imidazolidionone (bp226° C.), ϵ-caprolactam (bp270° C.), and γ-butylrolactone (bp204° C.-205° C.). Examples of the amides include formamide (bp210° C.), N-methylformamide (bp199° C.-201° C.), N,N-dimethylformamide (bp153° C.), and N,N-diethylformamide (bp176° C.-177° C.). Examples of the amines include monoethanolamine (bp170° C.), dimethanolaminde (bp268° C.), triethanolaminde (bp360° C.), N,N-dimethylmonoethanolamine (bp139° C.), N-methyldiethanolamine (bp243° C.), N-methylethanolamine (bp159° C.), N,N-phenylethanolamine (bp282° C.-287° C.), and 3-aminopropyl diethylamine (bp169° C.). Examples of the sulfur-containing compounds include dimethylsulfoxide (bp139° C.), sulfolane (bp285° C.), and thiodiglycol (bp282° C.). As other solid water-soluble organic solvents, saccharides are preferable. Examples of the saccharides include monosaccharides, disaccharides, oligosaccharides (including triaccharides and tetrasaccharide), and polysaccharides. Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include substances existing widely in nature, such as α-cyclodextrin and cellulose. Derivatives of these saccharides include reducing sugars of saccharides (for example, sugar alcohol, which is expressed by the general formula: HOCH$_2$(CHOH)$_n$CH$_2$OH, where n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

The amount of the water-soluble organic solvent contained in the pre-treatment liquid is not particularly limited. It is, however, preferably 10% by mass to 80% by mass, and more preferably 15% by mass to 60% by mass. When the amount of the water-soluble organic solvent is more than 80% by mass, the recording medium after pre-treatment may be hardly dried depending on the type of the water-soluble organic solvent used. When the amount is less than 10% by mass, water in the pre-treatment liquid evaporates, which may significantly change the composition of the pre-treatment liquid.

—Aliphatic Organic Acid Salt Compound, Inorganic Metal Salt Compound—

When an aliphatic organic acid salt compound or inorganic metal salt compound is added in the pre-treatment liquid, the pigment is likely to stay on the surface of a recording medium to enhance the salting-out effect, whereby the image density can be increased.

Examples of the aliphatic organic acid salt compound include sodium L-aspartate, magnesium L-aspartate, calcium ascorbate, sodium L-ascorbate, sodium succinate, disodium succinate, diammonium succinate, aluminum citrate, potassium citrate, calcium citrate, triammonium citrate, tripotassium citrate, trisodium citrate, diammonium citrate, disodium citrate, zinc lactate, aluminum lactate, ammonium lactate, potassium lactate, calcium lactate, sodium lactate, magnesium lactate, potassium tartrate, calcium tartrate, sodium DL-tartrate, and sodium potassium tartrate.

Examples of the inorganic metal salt compound include magnesium sulfate, aluminum sulfate, manganese sulfate, nickel sulfate, iron(II) sulfate, copper(II) sulfate, zinc sulfate, iron(II) nitrate, iron(III) nitrate, cobalt nitrate, strontium nitrate, copper(II) nitrate, nickel(II) nitrate, lead(II) nitrate, manganese(II) nitrate, nickel(II) chloride, calcium chloride, tin(II) chloride, strontium chloride, barium chloride, and magnesium chloride. Examples of a water-soluble monovalent-alkali-metal salt compound include sodium sulfate, potassium sulfate, lithium sulfate, sodium hydrogen sulfate, potassium hydrogen sulfate, sodium nitrate, potassium nitrate, sodium carbonate, potassium carbonate, sodium carbonate, potassium hydrogen carbonate, sodium chloride, and potassium chloride.

The amount of the aliphatic organic acid salt compound or inorganic metal salt compound in the total amount of the pre-treatment liquid is preferably 0.1% by mass to 30% by mass, and more preferably 1% by mass to 20% by mass. When the addition amount is more than 30% by mass, the aliphatic organic acid salt compound may be insufficiently dissolved in the pre-treatment liquid and precipitated. When the addition amount is less than 0.1% by mass, the effect of improving image density may be reduced.

—Surfactant—

In the pre-treatment liquid, a surfactant can be used for improving the wettability of the surface of recording medium, and the image density and color saturation of image formed matters and reducing white spots therein. In this case, to improve the wettability of the surface of recording medium and the ink permeability, it is preferable to adjust the static surface tension of the pre-treatment liquid to 30 mN/m or lower by the surfactant.

Preferred examples of the surfactant include nonionic surfactants, anionic surfactants, betaine surfactant, silicone surfactants, and fluorochemical surfactants. Particularly, at least one selected from silicone surfactants and fluorochemical surfactants capable of reducing the surface tension to 30 mN/m or lower is preferably used. These surfactants may be used alone or in combination.

As the fluorochemical surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluorochemical surfactant may not be obtained. When it is more than 16, degradation in storage stability etc. may arise.

Examples of the fluorochemical surfactants include nonionic fluorochemical surfactants, anionic fluorochemical surfactants, and amphoteric fluorochemical surfactants.

Examples of the nonionic fluorochemical surfactants include perfluoroalkyl phosphoric acid ester compound s, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property, with a fluorochemical surfactant represented by the following General Formula (1) being particularly preferred.

$$CF_3CF_2(CF_2CF_2)_m-CH_2CH_2O(CH_2CH_2O)_nH \qquad \text{General Formula (1)}$$

In the compound represented by General Formula (1), in order to impart the water-solubility, m is preferably an integer of 0 to 10, and n is preferably an integer of 0 to 40.

Examples of the anionic fluorochemical surfactants include perfluoroalkyl sulfonic acid compounds and perfluoroalkyl carboxylic acid compounds. Examples of the perfluoroalkyl sulfonic acid compounds include perfluoroalkyl sulfonic acids and perfluoroalkyl sulfonates. Examples of the perfluoroalkyl carboxylic acid compounds include perfluoroalkyl carboxylic acids and perfluoroalkyl carboxylates. Examples of the perfluoroalkyl phosphoric acid ester compounds include perfluoroalkyl phosphoric acid esters and salts of perfluoroalkyl phosphoric acid esters. Examples of the polyoxyalkylene ether polymer compounds having perfluoroalkyl ether groups as side chains include polyoxyalkylene ether polymers having perfluoroalkyl ether groups as side chains, sulfuric acid ester salts of polyoxyalkylene ether polymers having perfluoroalkyl ether groups as side chains, and salts of polyoxyalkylene ether polymers having perfluoroalkyl ether groups as side chains. Examples of counterions for salts in these fluorine-based surfactants include Li, Na, K, $NH_4$, $NH_3CH_2CH_2OH$, $NH_2(CH_2CH_2OH)_2$, and $NH(CH_2CH_2OH)_3$.

As specific examples of the fluorochemical surfactants, compounds represented by the following Formulae (2) to (10) are preferably used.

(1) Anionic Fluorochemical Surfactant

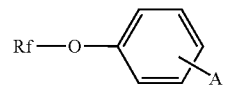

Formula (2)

In Formula (2), Rf represents a mixture of a fluorine-containing hydrophobic group represented by the following structural formula; A represents $-SO_3X$, $-COOX$, or $-PO_3X$ (where X represents a counter anion; specific examples thereof include a hydrogen atom, Li, Na, K, $NH_4$, $NH_3CH_2CH_2OH$, $NH_2(CH_2CH_2OH)_2$, or $NH(CH_2CH_2OH)_3$).

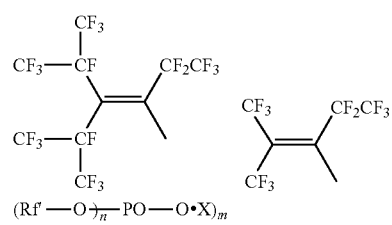

Formula (3)

In Formula (3), Rf' represents a fluorine-containing group represented by the following structural formula; X represents the same meaning as defined in Formula (2) above; n is an integer of 1 or 2; and m is an integer of 2−n.

Where n is an integer of 3 to 10.

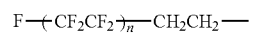

Formula (4)

In Formula (4), Rf represents the same meaning as defined in Formula (3) above; and X represents the same meaning as defined in Formula (2) above.

Formula (5)

In Formula (5), Rf represents the same meaning as defined in Formula (3) above; and X represents the same meaning as defined in Formula (2) above.

(2) Nonionic Fluorochemical Surfactant

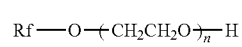

Formula (6)

In Formula (6), Rf represents the same meaning as defined in Formula (2) above; and n is an integer of 5 to 20.

Formula (7)

In Formula (7), Rf' represents the same meaning as defined in Formula (3) above; and n is an integer of 1 to 40.

(3) Amphoteric Fluorochemical Surfactant

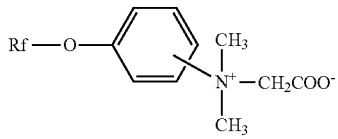

Formula (8)

In Formula (8), Rf represents the same meaning as defined in Formula (2) above.

(4) Oligomer Type Fluorochemical Surfactant

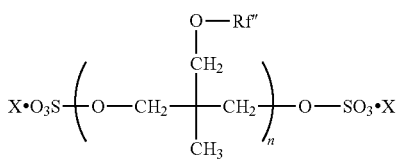

Formula (9)

In Formula (9), Rf' represents a fluorine-containing group represented by the following structural formula; n is an integer of 0 to 10; and X represents the same meaning as defined in Formula (2) above.

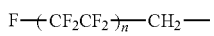

Where n is an integer of 1 to 4.

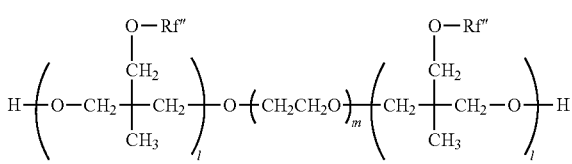

Formula (10)

Where Rf' represents the same meaning as defined in Formula (9); and l, m and n are each an integer of 0 to 10.

As the fluorochemical surfactants, commercially available products may be used. Examples of the commercially available products include SURFLON S-111, S-112, S-113, S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use. Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use. Examples thereof include a compound in which a polyalkylene oxide structure represented by Formula (11) is induced in Si portion side chain of dimethyl polysiloxane.

Structural Formula (11)

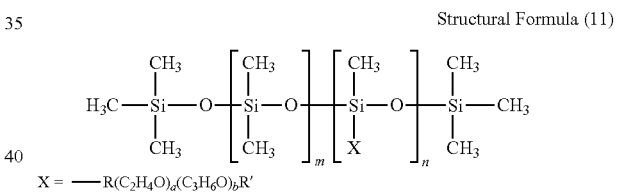

In Formula (11), m, n, a and b are each an integer; R represents an alkyl group, and R' represents an alkylene group.

As the polyether-modified silicone surfactant, commercial products may be used. Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33 and BYK-387 (produced by BYK Chemie GmbH).

Examples of the anionic surfactants include polyoxyethylene alkylether acetic acid salts, dodecylbenzene sulfonic acid salts, lauric acid salts, and salts of polyoxyethylene alkylether sulfate. Examples of the nonionic surfactants include polyoxyethylene alkylether, polyoxypropylene polyoxyethylene alkylether, polyoxyethylene alkylester, polyoxyethylene sorbitan aliphatic ester, polyoxyethylene alkylphenyl ether, polyoxyethylene alkylamine, and polyoxyethylene alkylamide.

The amount of the surfactant contained in the pre-treatment liquid is preferably 0.001% by mass to 5% by mass, and more preferably 0.05% by mass to 1% by mass. When the amount of the surfactant is less than 0.001% by mass, the effect of adding the surfactant may be reduced. When it is more than 5% by mass, there may be no difference in effect.
—Other Components—

The pre-treatment liquid preferably contains, as a penetrant, at least one of non-wettable polyol compounds having 8 to 11 carbon atoms or glycol ether compounds for the purpose of satisfying the permeability and the solubility in water. Here, the term "non-wettable" means having a solubility in the range of 0.2% by mass to 5.0% by mass in water at 25° C. Among these penetrants, preferred is a 1,3-diol compound represented by General Formula (12), and particularly preferred are 2-ethyl-1,3-hexane diol [solubility: 4.2% (25° C.)], and 2,2,4-trimethyl-1,3-pentane diol [solubility: 2.0% (25° C.)].

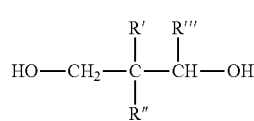

Formula (12)

In Formula (12), R' represents a methyl group or ethyl group; R" represents a hydrogen atom or methyl group; and R'" represents an ethyl group or propyl group.

Examples of the other non-wettable polyol compounds include, as aliphatic diols, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexen-1,2-diol.

The other penetrants usable in combination with those described above are not particularly limited, as long as they can be dissolved in the pre-treatment liquid and designed to have desired physical properties, and may be suitably selected in accordance with the intended use. Examples thereof include alkyl and aryl ethers of polyhydric alcohols (e.g., diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether); and lower alcohols (e.g., ethanol).

The amount of the penetrant contained in the pre-treatment liquid is preferably 0.1% by mass to 5.0% by mass. When the amount of the penetrant is less than 0.1% by mass, the effect of penetrating the pre-treatment liquid may disappear. When it is more than 5.0% by mass, the penetrant is separated from solvents because of its low solubility thereto and the effect of improving permeability may be saturated.

As required, the after-mentioned antiseptics and anticorrosives may be used in the pre-treatment liquid.

The pH of the pre-treatment liquid is preferably 5 to 9.5. When the pH is lower than 5, the neutralization of the water-soluble aliphatic organic acid by the organic mono ammonium compound is insufficient and thus the effect of improving the image quality may not be sufficiently obtained. When the pH is higher than 9.5, the image density may degrade due to liberated amine.

<Ink-Jetting Step>

The ink-jetting step is a step in which an inkjet ink containing the water-dispersible colorant, a water-soluble organic solvent, a surfactant, a penetrant and water is jetted onto the surface of the coating layer, onto which the pre-treatment liquid has been applied, to form an image on the recording medium.

The ink-jetting step is a step of applying a stimulus (energy) to droplets of the inkjet ink to fly (or be jetted) onto the surface of the coating layer of the recording medium (printing paper), onto which the inkjet ink has been applied, so as to form an image on the printing paper. As the method of flying droplets of the inkjet ink to printing paper in the ink-jetting step, any conventionally known ink-jetting recording methods can be employed. Examples of the methods include inkjet recording methods using a scanning print head, and inkjet recording methods in which a line type print head is used to form an image on a certain sheets of print paper.

In the ink-jetting step, the driving method of the recording head serving as an ink-flying unit is not particularly limited. It is possible to use a piezo-electric device actuator using a PZT-based material, a method of effecting thermal energy, and an on-demand type head utilizing an electrostatic force, and it is also possible to perform recording with a charge-controllable head of continuous-jetting type.

<<Inkjet Ink>>

An inkjet ink for use in an image forming method according to the embodiment contains a water-dispersible colorant, a water-soluble organic solvent, a surfactant, a penetrant and water, and has characteristics of aggregating by the action of the pre-treatment liquid.

—Water-Dispersible Colorant—

In the inkjet ink, a pigment is primarily used as a water-dispersible colorant in view of the weatherability, and, for the purpose of controlling color tone, a dye may be contained within the range not impairing the weatherability. The pigment is not particularly limited and may be suitably selected in accordance with the intended use. For example, inorganic pigments and organic pigments for black and color inks are exemplified. These pigments may be used alone or in combination.

As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific preferred examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

Specific examples of pigments for color ink include C.I. Pigment Yellow 1, 3, 12, 13, 14, 17, 24, 34, 35, 37, 42 (yellow iron oxides), 53, 55, 74, 81, 83, 95, 97, 98, 100, 101, 104, 408, 109, 110, 117, 120, 128, 138, 150, 151, 153 and 183; C.I. Pigment Orange 5, 13, 16, 17, 36, 43, and 51; C.I. Pigment Red 1, 2, 3, 5, 17, 22, 23, 31, 38, 48:2 and 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15, 15:1, 15:2 and 15:3 (Phthalocyanine Blue), 16, 17:1, 56, 60 and 63; and C.I. Pigment Green 1, 4, 7, 8, 10, 17, 18 and 36.

As preferred embodiments of colorants (in the case of using a pigment), the following first and second embodiments are exemplified:

(1) in a first embodiment, the colorant contains a polymer emulsion in which a water-insoluble or sparsely soluble coloring material is coated with an anionic polymer fine particle (i.e., a pigment coated with an anionic resin).

(2) in a second embodiment, the colorant contains a pigment having at least one hydrophilic group on its surface and exhibiting water-dispersibility in the absence of dispersants (hereinafter, otherwise referred to as "self-dispersible pigment".

In the present invention, in the case of the second embodiment, the colorant preferably contains a water-dispersible resin described below.

As the water-dispersible pigment according to the first embodiment, a polymer emulsion obtained by coating a pigment with an anionic polymer fine particle is preferably used, in addition to the above-mentioned pigments. The polymer emulsion obtained by coating a pigment with an anionic polymer fine particle is an emulsion in which a pigment is encapsulated in an anionic fine particle or a pigment is adsorbed on the surface of a polymer fine particle. In this case, all pigment particles are not necessarily encapsulated in or adsorbed on the surface of a pigment. That is, the pigment may be dispersed in an emulsion within the range not impairing the effects of the present invention. Examples of the polymer forming an anionic polymer emulsion (polymer in the polymer fine particle) include vinyl polymers, polyester polymers, and polyurethane polymers. Anionic polymers particularly preferably used in the present invention are vinyl polymers and polyester polymers. For example, the anionic polymers disclosed in Japanese Patent Application Laid-Open (JP-A) Nos. 2000-53897 and 2001-139849 can be used.

An ink containing a self-dispersible pigment according to the second embodiment is excellent in re-dispersibility after being died, and thus the ink allows for stable and easy recording with a simple cleaning operation, without causing nozzle clogging, even when the cleaning operation is stopped for a long time and ink water near inkjet head nozzles has evaporated.

The self-dispersible pigment described in the second embodiment is a pigment whose surface has been modified so that at least one hydrophilic group is, directly or via another atom group, combined with the surface of the pigment. To achieve the surface modification, for example, the following methods are employed: a method in which a specific functional group (functional group such as a sulfone group and a carboxyl group) is chemically combined with the surface of a pigment, or a method in which the surface of a pigment is subjected to wet oxidization treatment using at least one of a hypohalous acid or a salt thereof. Of these methods, a form is particularly preferable in which a carboxyl group is combined with the surface of a pigment and the pigment is dispersed in water. Since the surface of a pigment is modified and a carboxyl group is compound with the surface of the pigment, not only the dispersion stability but also higher print quality can be obtained, and the waterfastness of the recording medium after printing is further improved.

As the self-dispersible pigment, a self-dispersible pigment having ionicity (e.g, carbon black) is preferable, and an anionically charged-self-dispersible carbon black having an anionic hydrophilic group is particularly preferable.

Examples of the anionic hydrophilic group include —COOM, —$SO_3$M, —$PO_3$HM, —$PO_3M_2$, —$SO_2NH_2$, and —$SO_2$NHCOR (where M represents an alkali metal, ammonium or organic ammonium; and R represents an alkyl group having 1 to 12 carbon atoms, a phenyl group that may have a substituent or a naphthyl group that may have a substituent). Among these, —COOM, and —$SO_3$M are preferably used to be combined with the surface of a color pigment. Here, as "M" in the hydrophilic group, an alkali metal or organic ammonium is used. Examples of the alkali metal include lithium, sodium and potassium. Examples of the organic ammonium include monomethyl ammonium to trimethyl ammonium, monoethyl ammonium to triethyl ammonium, and monomethanol ammonium to trimethanol ammonium.

As a method of obtaining the anionically charged color pigment, by way of example, as a method of introducing —COONa into the surface of a color pigment, there may be exemplified a method a color pigment is oxidization-treated with a sodium hypochlorous acid; a method of sulfonating the surface of a color pigment; and a method in which a color pigment is reacted with the surface of a color pigment.

The hydrophilic group may be combined with the surface of carbon black via another atom group.

Examples of the another atom group include an alkyl group having 1 to 12 carbon atoms, a phenyl group that may have a substituent or a naphthyl group that may have a substituent. Specific examples of the substituent include —$C_2H_4$COOM (where M represents an alkali metal or a quaternary ammonium), and —$PhSO_3$M (where Ph represents a phenyl group; and M represents an alkali metal or a quaternary ammonium).

The volume average particle diameter ($D_{50}$) of the self-dispersible pigment is preferably 0.01 μm to 0.16 μm in the inkjet ink in view of the dispersion stability and ejection reliability.

The amount of the water-insoluble pigment contained in the inkjet ink, as a solid content, is preferably 2% by mass to 15% by mass, and more preferably 3% by mass to 12% by mass. When the amount of the water-insoluble pigment is less than 2% by mass, the color developing ability and image density of the ink may degrade. When it is more than 15% by mass, unfavorably, the viscosity of the ink is increased, causing a degradation in ink ejection stability.

—Water-Soluble Organic Solvent—

As a water-soluble organic solvent for use in the inkjet ink, the water-soluble organic solvent for use in the pre-treatment liquid is preferably used. A mass ratio of the water-dispersible colorant to the water-soluble organic solvent in the inkjet ink affects the ejection stability of ink ejected from an inkjet head. For example, when the addition amount of the water-soluble organic solvent is low regardless of high solid content of the water-dispersible colorant, evaporation of water near the ink meniscus of nozzles proceeds, and ejection defects may be caused. The amount of the water-soluble organic solvent contained in the inkjet ink is preferably 20% by mass to 50% by mass, and more preferably 20% by mass to 45% by mass. When amount of the water-soluble organic solvent is less than 20% by mass, the ejection stability may degrade and waste ink may adhere to instruments used to maintain the ink ejection apparatus. In contrast, when the amount of the water-soluble organic solvent is more than 50% by mass, the dryness of ink printed on paper may degrade, and further the quality of characters printed on regular paper may degrade.

—Surfactant—

As a surfactant for use in the inkjet ink, the surfactant for use in the pre-treatment liquid is preferably used. Particularly, as the surfactant, preferred is a surfactant having a high surface tension and high permeability and high leveling properties, without impairing its dispersion stability depending on the type of colorants used and a combination with the water-soluble organic solvent used. Examples of such a surfactant include at least one selected from anionic surfactants, non-ionic surfactants, silicone surfactants and fluorochemical surfactants. Among these, silicone surfactants, and fluorochemical surfactants are particularly preferable.

The amount of the surfactant contained in the inkjet ink is preferably 0.01% by mass to 3.0% by mass, and more preferably 0.5% by mass to 2% by mass. When the amount of the surfactant is less than 0.01% by mass, the effect of adding the surfactant may be substantially reduced. When it is more than 3.0% by mass, the permeability to recording media may be higher than necessary, possibly causing a degradation of image density and occurrence of ink-strikethrough.

—Penetrant—

As a penetrant for use in the inkjet ink, the penetrant for use in the pre-treatment liquid is preferably used. The amount of the penetrant contained in the inkjet ink is preferably 0.1% by mass to 4.0% by mass. When the amount of the penetrant is less than 0.1% by mass, quick-dryness may not be obtained, possibly causing image bleeding. When it is more than 4.0% by mass, the dispersion stability of colorants may be impaired, easily causing nozzle clogging, and the permeability to recording media may be higher than necessary, possibly causing a degradation of image density and occurrence of ink-strikethrough.

—Water-Dispersible Resin—

The inkjet ink preferably contains a water-dispersible resin in view of the pigment fixability to recording media. As the water-dispersible resin, a water-dispersible resin excellent in film formability (image formability) and having high water repellency, high waterfastness, and high weatherability is useful in recording images having high waterfastness and high image density (high color developing ability) Examples of the water-dispersible resin include condensed synthetic resins, addition synthetic resins and natural polymer compounds.

Examples of the condensed synthetic resins include polyester resins, polyurethane resins, polyepoxy resins, polyamide resins, polyether resins, poly(meth)acrylic resins, acryl-silicone resins, fluorine-based resins. Examples of the addition synthetic resins include polyolefin resins, polystyrene-based resins, polyvinyl alcohol-based resins, polyvinyl ester-based resins, polyacrylic acid-based resins, and unsaturated carboxylic acid-based resins. Examples of the natural polymer compounds include celluloses, rosins, and natural rubbers. Among these, particularly, polyurethane resin fine particles, acryl-silicone resin fine particles, and fluorine-based fine particles are preferable. Two or more of these water-dispersible resins may be used in combination, without any particular problems.

As the fluorine-based resin, fluorine-based resin fine particles having a fluoroolefin unit are preferable. Of these, fluorine-containing resin fine particles containing a fluoroolefin unit and a vinylether unit are particularly preferable. The fluoroolefin unit is not particularly limited and may be suitably selected in accordance with the intended use. Examples thereof include —CF$_2$CF$_2$—, —CF$_2$CF(CF$_3$)—, and —CF$_2$CFCl—. The vinylether unit is not particularly limited and may be suitably selected in accordance with the intended use. For example, compounds each represented by the following structural formula are exemplified.

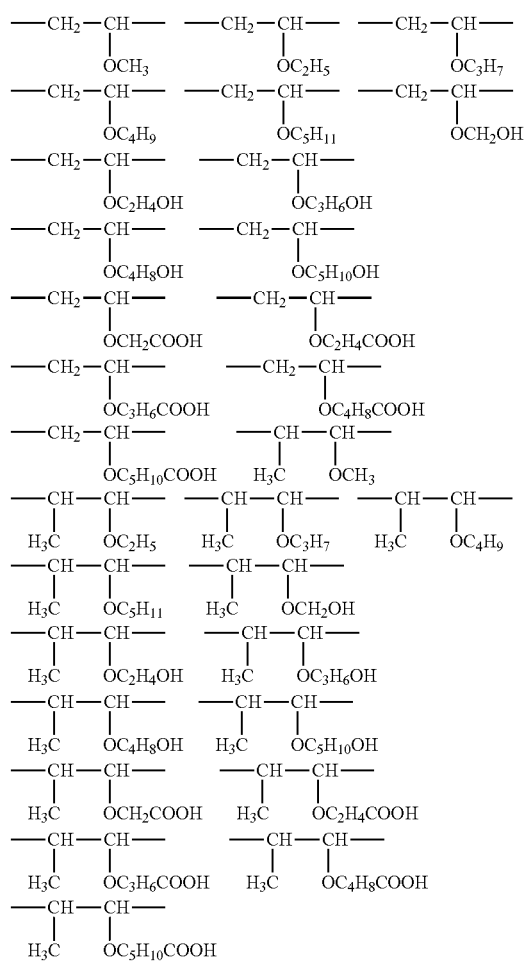

As the fluorine-containing vinylether-based resin fine particles containing a fluoroolefin unit and a vinylether unit, an alternated copolymer, in which the fluoroolefin unit and the vinylether unit are alternately copolymerized, is preferable. As such a fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd.; LUMIFLON FE4300, FE4500, FE4400, ASAHI GUARD AG-7105, AG-950, AG-7600, AG-7000, and AG-1100 produced by Asahi Glass Co., Ltd.

The water-dispersible resin may be used in the form of a homopolymer, a copolymer or a composite resin, and all of water-dispersible resins having a monophase structure or core-shell structure and those prepared by power-feed emulsion polymerization may be used As the water-dispersible resin, it is possible to use a resin itself having a hydrophilic group and self-dispersibility, and a resin itself having no dispersibility but to which the dispersibility is imparted with use of a surfactant and another resin having a hydrophilic group. Among these resins, an emulsion of a resin fine particle obtained by emulsification or suspension polymerization of ionomer of a polyester resin or polyurethane resin is most suitably used. In the case of emulsification of an unsaturated monomer, a resin emulsion is obtained by reacting water into which the unsaturated monomer, a polymerization initiator, a surfactant, a chain transfer agent, a chelating agent and a pH adjustor are added. Thus, a water-dispersible resin can be easily obtained, and desired properties are easily obtained because the resin components can be changed.

As the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons may be used alone or in combination. By combining these monomers, properties or the resulting resin can be flexibly modified. The properties of the resulting resin can also be modified with use of an oligomer type polymerization initiator, through a polymerization reaction or graft reaction.

Examples of the unsaturated carboxylic acids include acrylic acids, methacrylic acid, itaconic acids, fumaric acids, and maleic acids.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethoxy ammonium salt Examples of the polyfunctional (meth)acrylic acid monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxypheny 0 propane, 2,2'-bis(4-acryloxydiethoxyphenyl)propane, trimethylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomers include acrylamide, methacrylamide, N,N-dimethyacrylamide, methylene-bis-acrylamide, and 2-acrylamide-2-methylpropane sulfonic acid. Examples of the aromatic vinyl monomers include styrene, α-methylstyrene, vinyltoluene, 4-t-butylstyrene, chlorostyrene, vinylanisole, vinylnaphthalene, and divinylbenzene. Examples of the vinyl cyano compound monomers include acrylonitrile, and methacrylonitrile. Examples of the vinyl monomers include vinyl acetate, vinylidene chloride, vinyl ether, vinyl ketone, vinylpyrrolidone, vinyl sulfonic acid or salts thereof, vinyltrimethoxysilane, and vinyltriethoxysilane.

Examples of the allyl compound monomers include allylsulfonic acid or salts thereof, allylamine, ally chloride, diallylamine, and diallyldimethylammonium salts. Examples of the olefin monomers include ethylene, and propylene. Examples of the diene monomers include butadiene, and chloroprene. Examples of the oligomers having unsaturated carbon atoms include styrene oligomers having methacryloyl groups, styrene-acrylonitrile oligomer having methacryloyl groups, methyl methacrylate oligomers having methacryloyl groups, dimethyl siloxane oligomers having methacryloyl groups, and polyester oligomers having acryloyl groups.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with water-dispersible colorants, it is more preferably 6 to 11, and still more preferably 7 to 9.

The average particle diameter ($D_{50}$) of the water-dispersible resin is relevant to the viscosity of the dispersion liquid. In the case of water-dispersible resins having the same composition, the smaller the particle diameter, the higher is the viscosity at the same solid content. The average particle diameter ($D_{50}$) of the water-dispersible resin is preferably 50 nm or greater to prevent the resulting ink from having excessively high viscosity. When the average particle diameter is several tens micrometers, the ink cannot be used because the diameter is greater than that of nozzle holes of an inkjet head. When the diameter of the water-dispersible resin is smaller than that of nozzle holes but particles having large particle diameters are present in an ink, the ink ejection stability degrades. In order not to impair the ink ejection stability, the average particle diameter ($D_{50}$) of the water-dispersible resin is preferably 200 nm or smaller, and more preferably 150 nm or smaller.

The water-dispersible resin preferably has a function to fix the water-dispersible colorant on the surface of paper, to form a coat at normal temperature and to improve fixability of coloring material. Therefore, the minimum film forming temperature (MFT) of the water-dispersible resin is preferably 30° C. or lower. Further, the glass transition temperature of the water-dispersible resin is −40° C. or lower, tucks occur in printed matters because of the increased viscosity of the resin coat. Thus, the water-dispersible resin preferably has a glass transition temperature of −30° C. or higher. The amount of the water-dispersible resin contained in the inkjet ink, as a solid content, is preferably 1% by mass to 15% by mass, and more preferably 2% by mass to 7% by mass. Note that the solid content of the inkjet ink can be determined by a method of separating only water-dispersible pigment parts and water-dispersible resin parts from the inkjet ink. In addition, when a pigment is used as a water-dispersible colorant, a mass reduction ratio of the resulting inkjet ink is evaluated through a thermal mass analysis, thereby making it possible to measure a mass ratio between the colorant parts and the water-dispersible resin parts. When the molecular structure of the water-dispersible colorant is apparently known, in the case where the colorant is a pigment or dye, it is possible to determine the solid content parts of the colorant by the NMR. In the case where the colorant is an inorganic pigment contained in heavy metal atoms and molecular skeleton, or a metal-containing organic pigment or metal-containing dye, the solid content parts of the colorant can be determined by the fluorescent X-ray analysis.

—Other Components—

The other components for use in the inkjet ink are not particularly limited and may be suitably selected as required. For example, a pH adjustor, an antiseptic/antifungal agent, a chelating reagent, an anticorrosive, an antioxidant, an ultraviolet absorber, an oxygen absorber, and a light stabilizer are exemplified.

The pH adjustor is not particularly limited, as long as the pH of the inkjet ink to be prepared can be adjusted to 7 to 11 without adversely affecting the ink, and may be suitably selected in accordance with the intended use. Examples of the pH adjustor include alcohol amines, hydroxides of alkali metal elements, hydroxides of ammonium, phosphonium hydroxides, and carbonates of alkali metals. When the pH of the inkjet ink is lower than 7 or higher than 11, problems such as degeneration and leakage of ink and ejection defects may occur due to the large amount of ink dissolving an inkjet head and an ink supply unit used.

Examples of the alcohol amines include diethanol amine, triethanol amine, and 2-amino-2-ethyl-1,3-propanediol. Examples of the hydroxides of alkali metal elements include lithium hydroxide, sodium hydroxide and, potassium hydroxide. Examples of the hydroxides of ammonium include ammonium hydroxide, quaternary ammonium hydroxide, and quaternary phosphonium hydroxide. Examples of the carbonates of alkali metals include lithium carbonate, sodium carbonate, and potassium carbonate.

Examples of the antiseptic/antifungal agent include sodium dehydroacetate, sodium sorbate, sodium 2-pyridinethiol-1-oxide, sodium benzoate, and sodium pentachlorophenol.

Examples of the chelate reagent include sodium ethylene diamine tetraacetate, sodium nitrilotriacetate, sodium hydroxyethylenediamine triacetate, sodium diethylenetriamine pentaacetate, and sodium uramil diacetate.

Examples of the anticorrosive include acid sulfite, sodium thiosulfate, thiodiglycolic acid ammonium, diisopropyl ammonium nitrate, pentaerythritol tetranitrate, and dicyclohexyl ammonium nitrate.

Examples of the antioxidant include phenolic antioxidants (including hindered phenolic antioxidant), amine-based antioxidants, sulfuric antioxidants, and phosphoric antioxidant.

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

—Production Method of Inkjet Ink—

The inkjet ink is produced according to the following procedure: a water-dispersible colorant, a water-soluble organic solvent, a surfactant, a penetrant and water, if necessary, other components are dispersed or dissolved in an aqueous medium, and further if necessary, the mixed dispersion or solution is stirred and mixed. The stirring and mixing can be carried out by a sand mill, homogenizer, ball mill, paint shaker, ultrasonic wave dispersing machine, or the like. The stirring and mixing can also be carried out by a stirring device using an ordinary stirring blade; a magnetic stirrer; a high-speed dispersing device, etc.

—Physical Properties of Inkjet Ink—

Physical properties of the inkjet ink are not particularly limited and may be suitably adjusted in accordance with the intended use. For example, the viscosity and surface tension of the ink are preferably in the following ranges.

The viscosity of the inkjet ink at 25° C. is preferably 5 mPa·s to 20 mPa·s. By adjusting the viscosity of the ink to 5 mPa·s or higher, the effect of improving the print density and character quality can be obtained. In contrast, by suppressing the viscosity of the ink to be 20 mPa·s or lower, excellent ink ejection stability can be ensured.

Here, the viscosity can be measured, for example, by a viscometer (RE-550L, manufactured by TOKI SANGYO Co., Ltd.) at a temperature of 25° C.

The static surface tension of the inkjet ink at 25° C. is preferably 20 mN/m to 35 mN/m, and more preferably 20 mN/m to 30 mN/m. When the static surface tension is in the range of 20 mN/m to 35 mN/m, the permeability of the ink to recording media is increased, leading to a reduction of ink bleeding and an improvement in dryness of ink printed on regular paper. Therefore, since the surface of paper is easily wetted with the inkjet ink, the color developing ability is improved and the occurrence of white spots can be reduced. When the static surface tension is more than 35 mN/m, leveling of ink printed on a recording material is difficult to occur, which may take a longer time to dry the ink printed on the recording material.

Coloring of the inkjet ink is not particularly limited and may be suitably adjusted in accordance with the intended use. Examples of the color include yellow, magenta, cyan, and black. When recording is performed using an ink set composed of at least two of the colors used in combination, a multi-color image can be formed. When recording is performed using an ink set composed of all the colors used in combination, a full-color image can be formed.

<Post-Treatment Step>

The post-treatment step is a step of applying or jetting a post-treatment liquid onto the surface of the coating layer, onto which the inkjet ink has been applied, so as to form a transparent protective layer on the coating layer.

In the post-treatment step, a post-treatment liquid can be applied and caused to fly (jet-ejected) onto a recording medium. In the post-treatment step, the post-treatment may be applied over the entire surface of an image on the recording medium or may be applied only specific portions of the surface of an image. The method of applying the post-treatment liquid is not particularly limited, and is selected from various methods depending on the type of the post-treatment liquid. It is, however, the same method as used in the coating method of the pre-treatment liquid or a method of flying the inkjet ink (inkjet flying method) is preferably used. Of these methods, inkjet flying method is particularly preferable in view of the construction of an inkjet recording apparatus used and the storage stability of the post-treatment liquid. In the post-treatment step, a post-treatment liquid containing a transparent resin is applied on the surface of a formed image so that a dry adhesion amount of the post-treatment liquid is 0.5 g/m$^2$ to 10 g/m$^2$, thereby forming a protective layer on the recording medium.

The dry adhesion amount of the post-treatment liquid is preferably 0.5 g/m$^2$ to 10 g/m$^2$, and more preferably 2 g/m$^2$ to 8 g/m$^2$. When the dry adhesion amount is less than 0.5 g/m$^2$, almost no improvement in image quality (image density, color saturation, glossiness and fixability) is obtained. When the dry adhesion amount is more than 10 g/m$^2$, it is disadvantageous in cost efficiency, because the dryness of the protective layer degrades and the effect of improving the image quality is saturated.

The image forming method according to the embodiment may further include: heating the recording medium, onto which surface the post-treatment liquid has been applied or jetted, at 100° C. to 150° C. by a heating unit so that the inkjet ink is thermally fixed on the recording medium. By providing the image forming method with the fixing step, the glossiness and the fixability of an image recorded matter are improved. Here, as the heating unit, a heated roller, a drum heater, or the like is suitably used. When the inkjet ink is thermally fixed on a recording medium by the heating unit, a smooth portion of a roll heater or drum heater can be brought into contact with the surface of an image. The heating temperature is preferably a softening point or higher of a thermoplastic resin used for forming the protective layer. However, in the light of the image quality, safety and cost efficiency, a fixing roller heated to 100° C. to 150° C. is preferably used as the heating unit.

<<Post-Treatment Liquid>>

The post-treatment liquid contains components capable of forming a transparent protective layer over a recording medium, for example, a water-dispersible resin, a surfactant, and water, and further contains other components as required. As the material used for the post-treatment liquid, a resin composition containing a component capable of forming a polymer through irradiation of ultraviolet ray and a thermoplastic resin are preferable to provide glossiness to image portions or to protect image portions with a resin layer, that is, to improve the glossiness and fixability of image portions, although the material used differs depending on the coating method or the ink-flying method. Particularly, for the purpose of improving the glossiness/fixability, a thermoplastic resin emulsion (otherwise, referred to as a "water-dispersible resin") is preferable. Note that when the post-treatment is caused to fly by an inkjet recording apparatus, the post-treatment liquid preferably contains a wetting agent in an appropriate amount.

—Water-Dispersible Resin—

The glass transition temperature (Tg) of the water-dispersible resin is preferably −30° C. or higher, and more preferably in the range of −20° C. to 100° C. The minimum film forming temperature (MFT) of the water-dispersible resin is preferably 50° C. or lower, and more preferably 35° C. or lower. When the glass transition temperature (Tg) of the water-dispersible resin is lower than −30° C., tucking properties take place, like adhesives, even after water contained therein evaporates, and therefore, a recording medium coated with the post-treatment liquid may be difficult to put into practical use. When the minimum film forming temperature (MFT) of the water-dispersible resin is higher than 50° C., it is impossible to form a film for a short time even with use of a drying unit such as a heater, and hot air, and thus a recording medium coated with the post-treatment liquid may be difficult to put into practical use. The glass transition temperature of the water-dispersible resin can be measured, for example, by a TMA method, a DSC method, and a DMA method (Dynamic Mechanical Analysis). The minimum film forming temperature of the water-dispersible resin (MFT) can be measured, for example, by a minimum film forming temperature measuring device (MFT type).

As the water-dispersible resin, for example, an acrylic resin, a styrene-acrylic resin, a urethane resin, an acryl-silicone resin, a fluorine resin and the like are preferably used. The water-dispersible resin can be suitably selected from the same materials as that used for the inkjet ink. The amount of the water-dispersible resin contained, as a solid content, in the protective layer is preferably 1% by mass to 50% by mass. When the post-treatment is caused to fly on an inkjet recording apparatus, it is preferably 1% by mass to 30% by mass. When the resin content is more than 50% by mass, the viscosity of the post-treatment liquid may be increased. When the resin content is less than 1% by mass, the film formability may degrade, and a large amount of energy for water evaporation may be required.

The average particle diameter ($D_{50}$) of the water-dispersible resin in the post-treatment liquid is relevant to the viscosity of the post-treatment liquid. In the case of water-dispersible resins having the same composition, the smaller the particle diameter, the higher is the viscosity at the same solid content. The average particle diameter ($D_{50}$) of the water-dispersible resin is preferably 50 nm or greater to prevent the resulting post-treatment liquid from having excessively high viscosity. When the average particle diameter is several tens micrometers, it is unfavorable because the diameter is greater than that of nozzle holes of an inkjet head of an inkjet recording apparatus used for flying the post-treatment liquid. When the diameter of the water-dispersible resin is smaller than that of nozzle holes but particles having large particle diameters are present in the post-treatment liquid, the ink ejection stability degrades. In order not to impair the ink ejection stability, the average particle diameter ($D_{50}$) of the post-treatment liquid is preferably 200 nm or smaller, and more preferably 150 nm or smaller.

The surfactant is not particularly limited and may be suitably selected from those used in the inkjet ink. Examples of the other components of the post-treatment liquid include antifungal agents, antifoaming agents, and pH adjustors.

<Recording Medium>

The recording medium for use in the image forming method according to the embodiment is not particularly limited, as long as the liquid absorption properties thereof are within a certain range, and may be suitably selected in accordance with the intended use. However, in the light of image quality required, general-purpose printing paper called coating paper, gloss paper, coated paper, art paper, and super art paper are preferably used.

Among these recording media, general printing paper whose liquid absorption properties are within a certain range is preferable from the viewpoint that such paper enables recording an image excellent in image quality (image density, color saturation, beading resistance, and color bleeding resistance), having high glossiness and also excellent in smear adhesion resistance. Specifically, printing paper having a transfer amount of pure water thereinto measured at a contact time of 100 ms with a dynamic scanning liquid absorptometer of 1 ml/m$^2$ to 10 ml/m$^2$ is used. When the transfer amounts of the pre-treatment liquid, the ink and pure water measured at a contact time of 100 ms are excessively small, beading (non-uniform density) and color bleeding (bleeding between adjacent colors) are liable to occur. When the transfer amounts are excessively large, the ink dot diameters after recording are smaller than desired diameters, and a solid image may not be formed.

It is noted that the dynamic scanning absorptometer (DSA: JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The test sample is shaped like a disc. The dynamic scanning absorptometer scans one test sample by moving a liquid-absorbing head spirally over the test sample to thereby measure the amount of the liquid absorbed at as many points as necessary. The scanning speed is automatically changed according to a predetermined pattern. A liquid supplying head that supplies liquid to the test sample is connected via a Teflon (registered trademark) tube to the capillary. Positions of the meniscus in the capillary are automatically detected by an optical sensor. Specifically, the transfer amount of pure water was measured by a dynamic scanning absorptometer (K350 series, type D, Kyowa Co., Ltd.). The amount of transferred pure water at a contact time of 100 ms can be obtained by interpolation, using the transferred amounts measured at time points around each contact time.

The printing paper having liquid absorption properties within a certain range may be selected from commercially available ones. Examples of the commercially available printing paper include RICOH BUSINESS COAT GLOSS 100 (produced by Ricoh Company Ltd.); OK TOP COAT+, OK KINFUJI+, SA KINFUJI+(produced by Oji Paper Co., Ltd.); SUPER MI DULL, AURORA COAT, and SPACE DX (produced by Nippon Paper Co., Ltd.); a MAT, and MU COAT (produced by Hokuetsu Paper Mills Ltd.); RAICHO ART, and RAICHO SUPER ART (produced by Chuetsu Pulp & Paper Co., Ltd.); and PEARL COAT N (produced by Mitsubishi Paper Mills Ltd.). In addition, as the general printing paper having liquid absorption properties within a certain range, a printing paper having a coating layer on at least one side surface of a base described below is suitably used.

—Base—

Various materials may be used for the base depending on the purpose of paper. For example, a sheet of paper mainly made of wood fibers and a nonwoven fabric mainly made of wood and synthetic fibers may be used.

The sheet of paper is not particularly limited and may be suitably selected from known paper sheets, for example, a sheet of paper may be made of wood pulp or recycled pulp. Examples of wood pulp are leaf bleached kraft pulp (LBKP), needle bleached kraft pulp (NBKP), NBSP, LBSP, GP, and TMP.

Raw materials of the recycled pulp are indicated in the list of recycled paper standard quality specifications of the Paper Recycling Promotion Center, examples of which include hard white shaving, lined paper, cream white paper, white card, special white woody shavings, intermediate white woody shavings, fine printed paper, white coated paper, kent paper, white art paper, special top cuttings, separate top cuttings, newspapers and magazines. For example, chemical pulp or high-yield pulp made of recycled papers may be used as the base. Specific examples of recycled papers include printer papers such as non-coated computer paper serving as information-related paper, thermal paper, and pressure-sensitive paper; OA papers such as PCC paper; coated papers such as art paper, ultra-lightweight coated paper, and matt paper; and non-coated papers such as bond paper, color bond paper, note paper, letter paper, wrapping paper, fancy paper, medium quality paper, newspaper, woody paper, supermarket flyers, simili paper, pure-white roll paper, and milk cartons. These may be used alone or in combination.

Normally, recycled pulp is made by the following four steps:
(1) A defibrating step of breaking down used paper into fibers and separating ink from the fibers by using a mechanical force and a chemical in a pulper.
(2) A dust removing step of removing foreign substances (such as plastic) and dust in the used paper by using, for example, a screen and a cleaner.
(3) A deinking step of expelling the ink separated by a surfactant from the fibers by using a flotation method or a cleaning method.
(4) A bleaching method of bleaching the fibers by oxidization or reduction.

When mixing recycled pulp with wood pulp, the percentage of recycled pulp is preferably 40% or lower so that produced paper does not curl after recording.

As an internal filler for the base, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. These may be used alone or in combination.

As an internal sizing agent used when producing the base, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

The thickness of the base is not particularly limited and may be suitably selected in accordance with the intended use. It is, however, preferably 50 µm to 300 µm. The basis weight of the base is preferably 45 g/m² to 290 g/m².

—Coating Layer—

The coating layer contains a pigment and a binder (binding agent), and may further contain a surfactant and other components as required. An inorganic pigment or a combination of an inorganic pigment and an organic pigment can be used as the pigment.

Examples of the inorganic pigment include kaolin, talc, calcium bicarbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorite. Among these, kaolin is particularly preferable due to its superior glossability and ability to yield a texture that approaches that of paper for offset printing. Although examples of the kaolin include delaminated kaolin, calcined kaolin and surface-modified and other types of engineered kaolin, in consideration of glossability, kaolin having a particle size distribution in which 80% by mass or more of the particles have a particle diameter of 2 µm or less preferably accounts for 50% or more of all kaolin present. The addition amount of the kaolin is preferably 50 parts by mass or more with respect to 100 parts of the binder in the coating layer. When the amount of kaolin is less than 50 parts by mass, adequate effects are unable to be obtained with respect to glossiness. Although there are no particular limitations on the upper limit of the amount of the kaolin, in consideration of the fluidity of the kaolin, and particularly increases in viscosity in the presence of high shearing force, the amount of kaolin added is preferably 90 parts by mass or less from the viewpoint of coating aptitude.

Examples of the organic pigment include water-soluble dispersions of, for example, styrene-acrylic copolymer particles, styrene-butadiene copolymer particles, polystyrene particles or polyethylene particles. These organic pigments may be used in combination.

The addition amount of the organic pigment is preferably 2 parts by mass to 20 parts by mass with respect to 100 parts by mass of the total amount of the pigment in the coating layer. Since the organic pigment has superior glossability and the specific gravity thereof is small in comparison with inorganic pigment, it allows the obtaining of a coating layer having high bulk, high gloss and satisfactory surface coatability. When the amount of the organic pigment added is less than 2 parts by mass, the effects described above are not obtained, while when the amount added is more than 20 parts by mass, the fluidity of the coating liquid becomes poor, leading to a decrease in coating workability, while also not being economical in terms of cost. Although examples of the forms of the organic pigment include solid types, hollow types and doughnut-shaped types, in consideration of the balance among glossability, surface coatability and coating liquid fluidity, a hollow type is used preferably having an average particle diameter ($D_{50}$) of 0.2 μm to 3.0 μm and more preferably porosity of 40% or more. An aqueous resin is preferably used for the binder. At least one of a water-soluble resin and a water-dispersible resin is preferably used for the aqueous resin. There are no particular limitations on the water-soluble resin, the water-soluble resin can be suitably selected according to the intended use. Examples thereof include polyvinyl alcohol and polyvinyl alcohol modification products such as anion-modified polyvinyl alcohol, cation-modified polyvinyl alcohol or acetal-modified polyvinyl alcohol; polyurethane; polyvinyl pyrrolidone and polyvinyl pyrrolidone modification products such as copolymers of polyvinyl pyrrolidone and vinyl acetate, copolymers of vinyl pyrrolidone and dimethylaminoethyl methacrylate, copolymers of quaternized vinyl pyrrolidone and dimethylaminoethyl methacrylate or copolymers of vinyl pyrrolidone and methacrylamide propyl trimethyl ammonium chloride; celluloses such as carboxymethyl cellulose, hydroxyethyl cellulose or hydroxypropyl cellulose; cellulose modification products such as cationized hydroxyethyl cellulose; synthetic resins such as polyester, polyacrylic acid (ester), melamine resin or modification products thereof or copolymers of polyester and polyurethane; and poly(meth)acrylic acid, poly(meth)acrylamide, oxidized starch, phosphoric acid-esterified starch, self-modifying starch, cationized starch, various types of modified starch, polyethylene oxide, sodium polyacrylate and sodium arginate. These water-soluble resins may be used alone or in combination. Among these water-soluble resins, polyvinyl alcohol, cation-modified polyvinyl alcohol, acetal-modified polyvinyl alcohol, polyester, polyurethane and copolymers of polyester and polyurethane are particularly preferable from the viewpoint of ink absorption.

There are no particular limitations on the water-dispersible resin, a water-dispersible resin can be suitably selected in accordance with the intended use, and examples thereof include polyvinyl acetate, ethylene-vinyl acetate copolymers, polystyrene, styrene-(meth)acrylic acid ester copolymers, (meth)acrylic acid ester copolymers, vinyl acetate-(meth) acrylic acid (ester) copolymers, styrene-butadiene copolymers, ethylene-propylene copolymers, polyvinyl ether and silicone-acrylic copolymers. In addition, a crosslinking agent such as methylolated melamine, methylolated urea, methylolated hydroxypropylene urea or isocyanate may also be contained, and the water-dispersible resin may self-crosslink with a copolymer containing a unit such as N-methylolacrylamide. A plurality of these aqueous resins can also be used simultaneously.

The addition amount of the aqueous resin is preferably 2 parts by mass to 100 parts by mass and more preferably 3 parts by mass to 50 parts by mass with respect to 100 parts by mass of the pigment. The amount of the aqueous resin is determined so that the liquid absorption properties of the recording media are within a desired range.

Although a cationic organic compound is not necessarily required to be incorporated in the case of using a water-dispersible colorant as the colorant, there are no particular limitations thereon, and a cationic organic compound can be suitably selected and used in accordance with the intended use, examples of which include primary to tertiary amines that form an insoluble salt by reacting with sulfonic acid groups, carboxyl groups or amino groups and the like in a direct dye or acidic dye present in the water-soluble ink, and a monomer, oligomer, or polymer of a quaternary ammonium salt, with oligomers or polymers being particularly preferable.

Examples of the cationic organic compound include dimethylamine-epichlorohydrin polycondensation products, dimethylamine-ammonia-epichlorohydrin condensation products, poly(trimethylaminoethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensation product, polyalkylene polyamine-dicyandiamide ammonium salt condensation product, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivative), acrylamide-diallyldimethylammonium chloride copolymer, acrylate-acrylamide-diallylamine hydrochloride copolymer, ethylene imine derivatives such as polyethylene imine or acrylamine polymer, and polyethylene amine alkylene oxide modification products. These cationic organic compounds may be used alone or in combination.

Among these, combinations of low molecular weight cationic organic compounds such as dimethylamine-epichlorohydrin polycondensation products or polyallylamine hydrochloride and other comparatively high molecular weight cationic organic compounds such as poly(diallyldimethylammonium chloride) are used particularly preferably. The combined use of these cationic organic compounds improves image density and further decreases feathering as compared with the case of using alone. The cation equivalent of the cationic organic compound as determined by colloidal titration (using potassium polyvinyl sulfate and toluidine blue) is preferably 3 meq/g to 8 meq/g. Favorable results are obtained within the above-mentioned range of the dry-based deposition amount if the cation equivalent is within this range. Here, in measuring the cation equivalent using colloidal titration as described above, the cationic organic compound is diluted with distilled water to a solid content of 0.1% by mass without adjusting the pH.

The deposition amount of the cationic organic compound is preferably 0.3 g/m$^2$ to 2.0 g/m$^2$ on dry basis. If the deposition amount of the cationic organic compound is less than 0.3 g/m$^2$, adequate image density improving effects and feathering reduction effects are not obtained.

There are no particular limitations on the surfactant contained as required in the coating layer, the surfactant can be suitably selected in accordance with the intended use. Examples of the surfactant for use include an anionic surfactant, a cationic surfactant, an amphoteric surfactant and a nonionic surfactant. Among these, the nonionic surfactant is particularly preferable. Addition of the surfactant improves image waterfastness while also increasing image density and improving bleeding resistance.

Examples of the nonionic surfactant include higher alcohol ethylene oxide addition products, alkyl phenol ethylene oxide addition products, fatty acid ethylene oxide addition products, polyvalent alcohol fatty acid ester ethylene oxide addition products, higher fatty acid amine ethylene oxide addition products, fatty acid amide ethylene oxide addition products, oil ethylene oxide addition products, polypropylene glycol ethylene oxide addition products, glycerol fatty acid esters, pentaerythritol fatty acid esters, sorbitol and sorbitan fatty acid esters, sucrose fatty acid esters, polyvalent alcohol alkyl ethers and alkanol amine fatty acid amides. These nonionic surfactants may be used alone or in combination.

There are no particular limitations on the polyvalent alcohol, the polyvalent alcohol can be suitably selected in accordance with the intended use, and examples thereof include glycerol, trimethylolpropane, pentaerythritol, sorbitol and sucrose. In addition, ethylene oxide addition products are effective if a portion of the ethylene oxide is substituted with an alkylene oxide such as propylene oxide or butylene oxide. The substitution rate is preferably 50% or less. The hydrophilic lipophilic balance (HLB) of the nonionic surfactant is preferably 4 to 15, and more preferably 7 to 13.

The amount of the surfactant added is preferably 10 parts by mass or less, and more preferably 0.1 parts by mass to 1.0 part by mass with respect to 100 parts by mass of the cationic organic compound.

Other components can be further added as necessary to the coating layer within a range that does not impair the object and effects of the present invention. Examples of the other components include additives such as alumina powder, a pH adjuster, an antiseptic and an antioxidant.

There are no particular limitations on the method used to form the coating layer, the method can be suitably selected in accordance with the intended use, and the coating layer can be formed by a method by which the coating layer liquid is impregnated or coated onto the substrate. There are no particular limitations on the method for impregnating or coating the coating layer liquid, the method can be suitably selected in accordance with the intended use, and the coating liquid layer can be impregnated or coated using various types of coating machines such as a conventional size press, gate roll size press, film transfer size press, blade coater, rod coater, air knife coater or curtain coater. Among these, a preferred method in terms of cost contains impregnating or applying the coating layer liquid with a conventional size press, gate roll size press or film transfer size press and the like installed on a papermaking machine followed by on-machine finishing. There are no particular limitations on the adhesion amount of the coating layer and may be suitably adjusted in accordance with the intended use. It is preferably, as a solid content, 0.5 g/m$^2$ to 20 g/m$^2$, and more preferably 1 g/m$^2$ to 15 g/m$^2$.

Drying may be carried out following the impregnation or coating, there are no particular limitations on the drying temperature in this case. Although the drying temperature can be suitably selected in accordance with the intended use, it is preferably about 100° C. to about 250° C.

The recording media may further have a back layer formed on the back of the base, or another layer formed between the base and the coating layer or between the base and the back layer, and a protective layer can also be provided on the coating layer. Each of these layers may be in the form of a single layer or a plurality of layers.

<Apparatus>

The following describes an apparatus for forming an image with the inkjet ink by applying the pre-treatment liquid onto a recording medium in an image forming method according to the present embodiment with reference to a specific example illustrated in FIG. 1. The apparatus illustrated in FIG. 1 is a scanning type image forming apparatus configured to scan the surface of a recording medium using an inkjet recording head.

In a pre-treatment liquid applying unit and the inkjet recording apparatus illustrated in FIG. 1, a recording medium 6 is fed by a paper feed roller 7, and a light coating of a pre-treatment liquid 1 is uniformly applied to the recording medium 6 by an ink-feeding roller 4 and a counter roller 5. The pre-treatment liquid 1 is scooped up by a scoop roller 3, and uniformly applied to the surface of the ink-feeding roller 4 by a film thickness control roller 2. The recording medium 6 with the pre-treatment liquid 1 applied to its surface is conveyed to a record scanning section where an inkjet recording head 20 is disposed.

The length of a paper-conveying path from the end point of the pre-treatment liquid-applying-operation section (A section in FIG. 1) to the start point of the record scanning section (B section in FIG. 1) is designed to be longer than the length of the recording medium 6 in the paper feeding direction, and thus at the point in time when the recording medium 6 reaches the start point of the record scanning section, application of the pre-treatment liquid 1 can be completely finished. In this case, since application of the pre-treatment liquid 1 can be implemented before the inkjet recording head 20 starts scanning for printing and the recording medium 6 is intermittently conveyed, the pre-treatment liquid 1 can be continuously applied with uniformity onto the recording medium 6 at a constant conveyance speed of the recording medium 6. Note that the exemplary apparatus illustrated in FIG. 1 is designed so that the recording medium 6 requiring pre-treatment is supplied from the lower paper lower paper cassette and a recording medium 17 which is unnecessary to print is supplied from the upper paper cassette, it is convenient to provide a long paper-conveying path for conveying recording media.

Figure 2:
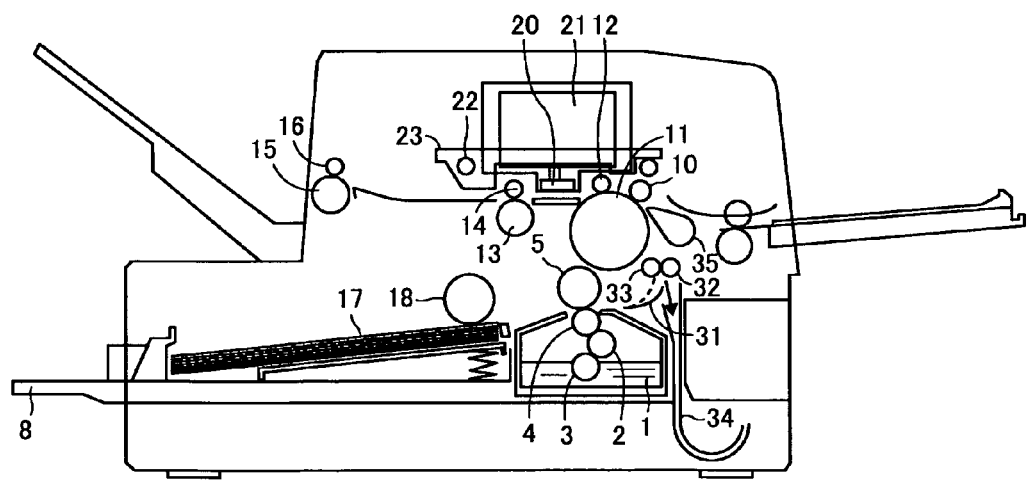
FIG. 2 is a schematic construction diagram illustrating the entire construction of another inkjet recording apparatus.

FIG. 2 illustrates another specific example of an apparatus for use in carrying out an image recording method according to the present embodiment. The apparatus illustrated in FIG. 2 is also a scanning type image forming apparatus configured to scan the surface of a recording medium using an inkjet recording head. This apparatus is an exemplary image recording apparatus constructed to be more compact than the apparatus illustrated in FIG. 1. A recording medium 17 is fed by a paper feed roller 7, and a light coating of a pre-treatment liquid 1 is uniformly applied to the recording medium 6 by an ink-feeding roller 4 and a counter roller 5. The pre-treatment liquid 1 is scooped up by a scoop roller 3, and uniformly applied to the surface of the ink-feeding roller 4 by a film thickness control roller 2. With being applied with the pre-treatment liquid 1, the recording medium 17 passes a record scanning section where an inkjet recording head 20 is disposed, and is conveyed until application of the pre-treatment liquid 1 on the recoating medium 17 is completed. At the point in time when application of the pre-treatment liquid 1 on the recording medium 17 is completed, the recording medium 17 is again returned to the record scanning section until the front end of the recording medium 17 reaches the start point of the record scanning section. Whether or not application of the pre-treatment liquid is completed can be detected by providing a known recording-medium detection unit (not illustrated) near the outlet of a pre-treatment liquid applying unit. This detection unit is not necessarily provided, and the apparatus may have a system configuration where information of the length of recording medium is previously input in a controller, and the feed per revolution of the outer periphery of a recording medium conveying roller corresponds to the length of the recording medium by controlling the number of revolutions of a motor.

The recording medium 17 with the pre-treatment liquid 1 applied to its surface is conveyed again to the record scanning section before the pre-treatment liquid 1 is dried and solidified. At this time, the recording medium 17 is intermittently conveyed again to the record scanning section at the right moment of scanning operation of the inkjet recording head 20. If a recording medium is returned to the same path through which it is first conveyed, the rear end of the recording medium is reversely entered into the pre-treatment liquid applying unit, possibly causing defects such as nonuniform coating and jam of recording medium. In the present embodiment, when a recording medium is returned backward, the direction thereof is switched by a recording medium guide 31. That is, when the recording medium 17 is conveyed backward after being applied with the pre-treatment liquid 1, the recording medium guide 17 is moved by a known unit such as a solenoid and a motor to the position indicated with a dotted line in the figure. With this configuration, the recording medium 17 is conveyed to the position where a recording medium return guide 34, and thus it is possible to prevent smear of recording medium 17 and paper jam.

Preferably, the pre-treatment step is continuously performed at a constant linear speed of 10 mm/s to 1,000 mm/s. For this reason, in this exemplary apparatus, a sheet form recording medium is used, as for certain sheets of recording medium, a step of recording an image on the recording medium by an inkjet recording method is started after completion of a step of applying a pre-treatment liquid onto the certain sheets of recording medium. In most cases, in image recording apparatuses, the speed of applying a pre-treatment liquid does not correspond to the speed of image recording, and thus there is a time difference from a time when a pre-treatment liquid is applied onto a recording medium to a time when an image is recorded, between the record starting portion of the certain sheets and the record end portion thereof. Even if the time difference is significant, it is possible to substantially prevent evaporation of water from the pre-treatment liquid having a higher boiling point than that of water, containing a large amount of a hydrophilic solvent with a low evaporation rate and having a water ratio close to an equilibrium water content in the air under an environment where a printer is used. Therefore, the difference in image quality caused between the recording start portion and the recording end portion of sheets of recording medium can be lowered to at least the level or lower where such a difference can be visually observed.

As is evident from the conveying process of a recording medium in this apparatus, in most cases, a recording medium is necessary to be conveyed with members in contact with the recording medium applied with a pre-treatment liquid for forming an image, such as rollers, roller bearings, and guides, after application of the pre-treatment liquid onto the recording medium. In this case, if the pre-treatment liquid applied to a recording medium is transferred to recording-conveying members, conveying functions may be damaged, and smear may accumulate, causing degradation of image quality. The occurrence of the problem can be prevented by using members, for example, a guide of a wave-shaped plate, a spur-shaped roller bearing, and a roller whose surface is made of a water-repellent material.

However, it is desirable that the pre-treatment liquid applied to a recording medium be quickly absorbed into the recording medium and the surface of recording medium appears dry. To achieve this object, it is effective to adjust the surface tension of the pre-treatment liquid to 30 mN/m or lower so that the liquid is quickly absorbed into the recording medium. The "drying and solidifying" of the pre-treatment that has been applied to a recording medium does not mean that the pre-treatment liquid is absorbed into the recording medium and the surface of the recording medium appears dry as described above, but means that liquid compounds in the pre-treatment liquid, such as water, evaporates and cannot maintain a liquid state, thereby the pre-treatment liquid is solidified. Even if the pre-treatment liquid is absorbed into a recording medium and the surface thereof appears dry by using a combination of a pre-treatment liquid applying unit and an image recording apparatus as described above, inkjet recording can be performed with a state where the pre-treatment liquid is not actually solidified, and the image quality can be remarkably improved with an extremely small amount of the pre-treatment liquid.

EXAMPLES

Hereinafter, Examples of the present invention will be described in detail, however, these Examples shall not be construed as limiting the scope of the present invention.

Preparation Example 1

Preparation of Aqueous Solution A of Water Soluble Polymer Compound

Components having the following composition were stirred and heated with a stirrer so as to dissolve an α-olefin-maleic anhydride copolymer represented by Structural Formula (13) to obtain a solution, and a slight amount of insoluble matters was filtered out through a filter having an average pore size of 5 μm, thereby preparing an aqueous solution A of water-soluble polymer compound.
<Composition>

| | |
|---|---|
| α-olefin-maleic anhydride copolymer represented by Structural Formula (13) (produced by Seiko PMC Co., T-YP112, R: olefin chain having 20 to 24 carbon atoms, n: an integer of 30 to 100, acid value: 190 mgKOH/g, weight average molecular weight: 10,000) | 10.0 parts by mass |

Formula (13)

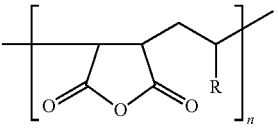

| | |
|---|---|
| 1-N LiOH aqueous solution (1.2 times in acid value of that of α-olefin-maleic anhydride copolymer represented by Structural Formula (13)) | 17.34 parts by mass |
| ion-exchanged water | 72.66 parts by mass |

Preparation Example 2

Preparation of Surface Treated Black Pigment Dispersion Liquid

A carbon black having a CTAB surface area of 150 m²/g, a DBP oil absorption of 100 mL/100 g (90 g) was added to a 2.5 N sodium sulfate (3,000 mL), and the components were oxidatively treated by stirring at 60° C. and 300 rpm for 10 hours so as to react with each other. The reaction liquid was filtered, the filtered-out carbon black was neutralized with a sodium hydroxide solution and then subjected to ultrafiltration.

The obtained carbon black was washed with water, dried, and then dispersed in pure water so that the solid content of pigment was 30% by mass of pigment, followed by stirring sufficiently, to thereby obtain a surface treated black pigment dispersion liquid. An average particle diameter ($D_{50}$) of the obtained black pigment dispersion liquid was measured by a particle size distribution measuring device (NANOTRACK UPA-EX150, manufactured by Nikkiso Co., Ltd.) and found to be 103 nm.

Preparation Example 3

Preparation of Magenta-Pigment-Containing-Polymer Microparticle Dispersion Liquid —Preparation of Polymer Solution A—

In a 1L-flask equipped with a mechanical stirrer, a thermometer, a nitrogen-inlet tube, a reflux tube and a dropping funnel, which had been sufficiently purged with nitrogen gas, styrene (11.2 g), acrylic acid (2.8 g), lauryl methacrylate (12.0 g), polyethylene glycol methacrylate (4.0 g), styrene macromer (4.0 g), and mercaptoethanol (0.4 g) were added and mixed, and the temperature of the system was increased to 65° C. Next, a mixed solution of styrene (100.8 g), acrylic acid (25.2 g), lauryl methacrylate (108.0 g), polyethylene glycol methacrylate. (36.0 g), hydroxylethyl methacrylate (60.0 g), styrene macromer (36.0 g), mercaptoethanol (3.6 g), azobis methylvaleronitrile (2.4 g), and methylethylketone (18 g) was dropped into the flask over 2.5 hours. After the dropping, a mixed solution of azobis methylvaleronitrile (0.8 g) and methylethylketone (18 g) was dropped into the flask over 0.5 hours. After the mixture was aged at 65° C. for 1 hour, azobis methylvaleronitrile (0.8 g) was added thereto, and further aged for 1 hour. Upon completion of the reaction, methylethylketone (364 g) was added to the flask to thereby obtain 800 g of a polymer solution A having a concentration of 50% by mass.

—Preparation of Pigment-Containing-Polymer Microparticle Dispersion Liquid—

The polymer solution A (28 g) and C.I. Pigment Red 122 (42 g), a 1 mol/L potassium hydroxide aqueous solution (13.6 g), methylethylketone (20 g), and ion exchanged water (13.6 g) were sufficiently stirred and then kneaded using a roll mill. After the resulting paste was put into pure water (200 g) and sufficiently stirred, the methylethylketone and water were distilled away using an evaporator, and the dispersion liquid was pressure filtered through a polyvinylidene fluoride membrane filter having an average pore size of 5.0 μm so as to remove coarse particles therefrom, thereby obtaining a magenta-pigment-containing-polymer microparticle dispersion liquid having a pigment concentration of 15% by mass and a solid content of 20% by mass. An average particle diameter ($D_{50}$) of polymer microparticles in the resulting magenta-pigment-containing-polymer microparticle dispersion liquid was measured in the same manner as in Preparation Example 2 and found to be 127 nm.

Preparation Example 4

Preparation of Cyan-Pigment-Containing-Polymer Microparticle Dispersion Liquid—

A cyan-pigment-containing-polymer microparticle dispersion liquid was obtained in the same manner as in Preparation Example 3, except that the pigment C.I. Pigment Red 122 was changed to a phthalocyanine pigment (C.I. Pigment Blue 15:3). An average particle diameter ($D_{50}$) of polymer microparticles in the resulting cyan-pigment-containing-polymer microparticle dispersion liquid was measured in the same manner as in Preparation Example 2 and found to be 93 nm.

Preparation Example 5

Preparation of Yellow-Pigment-Containing-Polymer Microparticle Dispersion Liquid A yellow-pigment-containing-polymer microparticle dispersion liquid was obtained in the same manner as in Preparation Example 3, except that the pigment C.I. Pigment Red 122 was changed to a monoazo yellow pigment (C.I. Pigment Yellow 74). An average particle diameter ($D_{50}$) of polymer microparticles in the resulting yellow-pigment-containing-polymer microparticle dispersion liquid was measured in the same manner as in Preparation Example 2 and found to be 76 nm.

Preparation Example 6

Carbon Black Pigment-Containing-Polymer Microparticle Dispersion Liquid

A carbon black-pigment-containing-polymer microparticle dispersion liquid was obtained in the same manner as in Preparation Example 3, except that the pigment C.I. Pigment Red 122 was changed to a carbon black (FW100, produced by Degussa HÜLS AG). An average particle diameter ($D_{50}$) of polymer microparticles in the resulting carbon black-pigment-containing-polymer microparticle dispersion liquid was measured in the same manner as in Preparation Example 2 and found to be 104 nm.

Preparation Example 7

Preparation of Yellow Pigment-Surfactant-Containing Dispersion Liquid

| | |
|---|---|
| monoazo yellow pigment (C.I. Pigment Yellow 74, produced by Dainichiseika Color & Chemicals Mfg. Co., Ltd.) | 30.0 parts by mass |
| polyoxyethylene styrene phenyl ether (nonionic surfactant, produced by DAI-ICHI KOGYO SEIYAKU CO., LTD., NOIGEN EA-177, HLB value = 15.7) | 10.0 parts by mass |
| ion exchanged water | 60.0 parts by mass |

First, the above-mentioned surfactant was dissolved in ion exchanged water and mixed with the above-mentioned pigment. The mixture was sufficiently wetted, and then dispersed at 2,000 rpm for 2 hours using a wet type dispersing device (DYNOMILL KDL A Model, manufactured by WAB Corporation) filled with zirconia beads having a diameter of 0.5 mm, thereby obtaining a primary pigment dispersion. Next, to the primary pigment dispersion, a water-soluble polyurethane resin (4.26 parts by mass) (TAKELAC W-5661, produced by MITSUI TAKEDA CHEMICALS, INC.; amount of effective ingredient: 35.2% by mass; acid value: 40 mgKOH/g; molecular weight: 18,000) was added as an aqueous solution of water-soluble polymer compound and sufficiently stirred to thereby obtain a yellow pigment-surfactant-containing dispersion liquid. An average particle diameter ($D_{50}$) of pigment dispersion in the yellow pigment-surfactant-containing dispersion liquid was measured in the same manner as in Preparation Example 2 and found to be 62 nm.

Preparation Example 8

Preparation of Magenta Pigment-Surfactant-Containing Dispersion Liquid

| | |
|---|---|
| quinacridone pigment (C.I. Pigment Red 122, produced by Dainichiseika Color & Chemicals Mfg. Co., Ltd.), | 30.0 parts by mass |
| polyoxyethylene-p-naphthylether (nonionic surfactant, produced by TAKEMOTO OIL & FAT, RT-100, HLB value = 18.5) | 10.0 parts by mass |
| ion exchanged water | 60.0 parts by mass |

First, the above-mentioned surfactant was dissolved in ion exchanged water and mixed with the above-mentioned pigment. The mixture was sufficiently wetted, and then dispersed at 2,000 rpm for 2 hours using a wet type dispersing device (DYNOMILL KDL A Model, manufactured by WAB Corporation) filled with zirconia beads having a diameter of 0.5 mm, thereby obtaining a primary pigment dispersion. Next, to the primary pigment dispersion, a water-soluble styrene-(meth)acrylic acid copolymer (7.14 parts by mass) (JC-05, produced by Seiko PMC Co.; amount of effective ingredient: 21% by mass; acid value: 170 mgKOH/g; weight average molecular weight: 16,000) was added and sufficiently stirred to thereby obtain a magenta pigment-surfactant-containing dispersion liquid. An average particle diameter ($D_{50}$) of pigment dispersion in the magenta pigment-surfactant-containing dispersion liquid was measured in the same manner as in Preparation Example 2 and found to be 83 nm.

Preparation Example 9

Preparation of Cyan Pigment-Surfactant-Containing Dispersion Liquid

| | |
|---|---|
| phthalocyanine pigment (C.I. Pigment Blue 15:3, produced by Dainichiseika Color & Chemicals Mfg. Co., Ltd.) | 30.0 parts by mass |
| polyoxyethylene styrene phenyl ether (nonionic surfactant, produced by DAI-ICHI KOGYO SEIYAKU CO., LTD., NOIGEN EA-177, HLB value = 15.7) | 10.0 parts by mass |
| ion exchanged water | 60.0 parts by mass |

First, the above-mentioned surfactant was dissolved in ion exchanged water and mixed with the above-mentioned pigment. The mixture was sufficiently wetted, and then dispersed at 2,000 rpm for 2 hours using a wet type dispersing device (DYNOMILL KDL A Model, manufactured by WAB Corporation) filled with zirconia beads having a diameter of 0.5 mm, thereby obtaining a primary pigment dispersion. Next, to the primary pigment dispersion, the aqueous solution A of water-soluble polymer compound of Preparation Example 1 (7.51 parts by mass) and a water-soluble polyester resin (2.51 parts by mass) (NICHIGO POLYESTER W-0030, produced by Nippon Synthetic Chemical Industry Co., Ltd.; amount of effective ingredient: 29.9% by mass; acid value: 100 mgKOH/g; weight average molecular weight: 7,000) was added and sufficiently stirred to thereby obtain a cyan pigment-surfactant-containing dispersion liquid. An average particle diameter ($D_{50}$) of pigment dispersion in the cyan pigment-surfactant-containing dispersion liquid was measured in the same manner as in Preparation Example 2 and found to be 78 nm.

Production Examples 1 to 8

Production of Recording Inks 1 to 8

First, the water-soluble organic solvent (wetting agent), penetrant, surfactant, antifungal agent and water, each in an amount shown in Table 1 below, were mixed, and stirred for 1 hour so as to be mixed uniformly. In addition, depending on the mixture liquid, a water-dispersible resin was added to the mixture liquid, stirred for 1 hour, and a pigment dispersion liquid, an antifoaming agent and a pH adjuster were added thereto, followed by stirring for 1 hour. The resulting dispersion liquid was pressure filtered through a polyvinylidene fluoride membrane filter having an average pore size of 5.0 µm so as to remove coarse particles and dust therefrom, thereby producing recording inks of Production Examples 1 to 8.

TABLE 1

| | Component (% by Mass) | 1 | 2 | 3 | 4 | 5 | 6 | 7 | 8 |
|---|---|---|---|---|---|---|---|---|---|
| Pigment dispersion liquid | Surface-treatment black pigment dispersion liquid (Prep. Ex. 2) | | | | | 26.7 | | | |
| | Magenta pigment-containing polymer fine particle dispersion liquid (Prep. Ex. 3) | | 53.3 | | | | | | |
| | Cyan pigment-containing polymer fine particle dispersion liquid (Prep. Ex. 4) | | | 33.3 | | | | | |
| | Yellow pigment-containing polymer fine particle dispersion liquid (Prep. Ex. 5) | | | | 33.3 | | | | |
| | Black pigment-containing polymer fine particle dispersion liquid (Prep. Ex. 6) | 53.3 | | | | | | | |
| | Yellow pigment-surfactant-containing dispersion liquid (Prep. Ex. 7) | | | | | | 16.7 | | |
| | Magenta pigment-surfactant-containing dispersion liquid (Prep. Ex. 8) | | | | | | | | 26.7 |

TABLE 1-continued

| | Component (% by Mass) | Production Examples | | | | | | | |
|---|---|---|---|---|---|---|---|---|---|
| | | 1 | 2 | 3 | 4 | 5 | 6 | 7 | 8 |
| | Cyan pigment-surfactant-containing dispersion liquid (Prep. Ex. 9) | | | | | | | | 16.7 |
| Water-dispersible resin | Fluororesin emulsion | | | | | 10.6 | 6.2 | 6.2 | 6.2 |
| | Acryl-silicone resin emulsion | 9.0 | | | | | | | |
| Water-soluble organic solvent | 1,3-butanediol | | 21.6 | 26.0 | 26.0 | | 25.0 | 27.0 | 25.5 |
| | 3-methyl-1,3-butanediol | 15.0 | | | | 18.0 | | | |
| | 2-pyrrolidone | | | | | 2.0 | | | |
| | Glycerin | 15.0 | 14.4 | 13.0 | 13.0 | 9.0 | 8.3 | 9.0 | 8.5 |
| Penetrant | 2-ethyl-1,3-hexanediol | 1.0 | 1.0 | 1.0 | 1.0 | 2.0 | 2.0 | 2.0 | 2.0 |
| | 2,2,4-trimethyl-1,3-pentanediol | 1.0 | 1.0 | 1.0 | 1.0 | | | | |
| Surfactant | ZONYL FS-300 | 2.5 | 2.5 | 2.5 | 2.5 | 1.0 | 1.0 | 1.0 | 1.0 |
| | SOFTANOL EP-7025 | | | | | 0.6 | 0.6 | 0.6 | 0.6 |
| Antifungal agent | PROXEL GXL | 0.05 | 0.05 | 0.05 | 0.05 | 0.05 | 0.05 | 0.05 | 0.05 |
| Antifoaming agent | Silicone antifoaming agent KM-72F | 0.05 | 0.05 | 0.05 | 0.05 | 0.10 | 0.10 | 0.10 | 0.10 |
| pH adjuster | 2-amino-2-ethyl-1,3-propanediol | 0.3 | 0.2 | 0.5 | 0.3 | 0.5 | 0.2 | 0.5 | 0.5 |
| | Pure water | balance | balance | balance | balance | balance | balance | balance | balance |
| | Total (% by mass) | 100 | 100 | 100 | 100 | 100 | 100 | 100 | 100 |

The abbreviations described in Table 1 mean the following:
fluorine resin emulsion: produced by Asahi Glass Co., Ltd.; LUMIFLON FE4500; solid content: 52% by mass, average particle diameter: 136 nm; minimum filming temperature (MFT)=28° C.
acryl-silicone resin emulsion: POLYZOL ROY6312, produced by Showa High Polymer Co., Ltd.; solid content: 40% by mass, average particle diameter: 171 nm; minimum filming temperature (MFT)=20° C.
ZONYL FS-300: polyoxyethylene perfluoroalkyl ether (produced by Dupont; amount of effective ingredient: 40% by mass)
SOFTANOL EP-7025: polyoxyalkylene alkylene ether (produced by Nippon Shokubai Co., Ltd.; amount of effective ingredient: 100% by mass)
PROXEL GXL: antifungal agent containing 1,2-benzisothiazolin-3-one at the main component (produced by Avecia Inc., amount of effective ingredient: 20% by mass, dipropylene glycol is contained)
KM-72F: self-emulsified silicone antifoaming agent (produced by Shin-Etsu silicone Corp.; amount of effective ingredient: 100% by mass)

Next, physical properties on each of the inks of Production Examples 1 to 8 were measured as follows. The measurement results are shown in Table 2.

<Average Particle Diameter of Ink>

The average particle diameter ($D_{50}$) of each ink was measured using a particle size distribution measurement device (NANOTRACK UPA-EX150, manufactured by Nikkiso Co., Ltd.).

<Measurement of Viscosity of Ink>

The viscosity of each ink at a temperature of 25° C. was measured using a viscometer (RE-80L, manufactured by TOKI SANGYI Co., Ltd.).

<Measurement of Surface Tension of Ink>

The surface tension of each ink at a temperature of 25° C. was measured using an automatic surface tension meter (CBVP-Z, manufactured by Kyowa Interface Science Co., LTD.).

TABLE 2

| | Physical Properties of Ink | | |
|---|---|---|---|
| | Average particle diameter $D_{50}$ (nm) | Viscosity (mP·s) | Surface tension (mN/m) |
| Production Ex. 1 | 107 | 7.95 | 25.8 |
| Production Ex. 2 | 131 | 8.06 | 26.3 |
| Production Ex. 3 | 98 | 8.10 | 26.1 |
| Production Ex. 4 | 83 | 8.04 | 26.0 |
| Production Ex. 5 | 110 | 7.99 | 24.2 |
| Production Ex. 6 | 74 | 8.15 | 24.7 |
| Production Ex. 7 | 88 | 8.05 | 24.8 |
| Production Ex. 8 | 85 | 7.91 | 24.6 |

Preparation Examples 10 to 18

Preparation of Pre-Treatment Liquid

Each pre-treatment liquid was produced in the following procedure. First, the materials shown in Table 3 were stirred for 1 hour to obtain a uniform mixture. The mixture was pressure filtered through a polyvinylidene fluoride membrane filter having an average pore size of 5.0 μM so as to remove coarse particles, insoluble matters, etc. therefrom, thereby producing pre-treatment liquids of Preparation Examples 10 to 18.

TABLE 3

| Component (% by mass) | | Preparation Examples | | | | | | | | |
|---|---|---|---|---|---|---|---|---|---|---|
| | | 10 | 11 | 12 | 13 | 14 | 15 | 16 | 17 | 18 |
| Water-soluble aliphatic organic acid | L-lactic acid (*1) | 5.00 | | | 15.00 | | | | | 11.76 |
| | L(+)-tartaric acid (*2) | | 10.00 | | | 20.00 | | | | |
| | DL-malic acid (*3) | | | 15.00 | | | 10.0 | | | |
| Water-soluble organic monoamine compound | 3-amino-1-propanol | | 10.01 | | | 20.02 | | | | |
| | 2-amino-2-ethyl-1,3-propanediol | 6.61 | | 26.66 | | | 17.77 | | | |
| | N,N-diethylethanolamine | | | | 23.42 | | | | | |
| Metal-free salt compound | Magnesium sulfate | | | | | | | | 10.00 | |
| | Calcium nitrate | | | | | | | 10.00 | | |
| Water-soluble organic solvent | 3-methyl-1,3-hexanediol | | 10.00 | 15.00 | | 5.00 | 5.00 | 10.00 | 20.00 | 10.00 |
| | Glycerin | 15.00 | 15.00 | 10.00 | | 20.00 | 10.00 | 15.00 | 10.00 | 20.00 |
| Penetrant | 2-ethyl-1,3-hexanediol | 2.0 | 1.00 | 1.00 | | | 1.00 | 1.00 | | 2.00 |
| Surfactant | ZONYL FS-300 | | | 2.50 | | | 2.50 | | | |
| | FTERGENT 251 | | 1.00 | | | 1.00 | | 1.00 | | 0.50 |
| | KF-643 | | | | 1.00 | | | | | |
| Antifungal agent | PROXEL GXL | 0.05 | 0.05 | 0.05 | 0.05 | 0.05 | 0.05 | 0.05 | 0.05 | 0.05 |
| Anti-corrosive | 1,2,3-benzotriazole | 0.10 | 0.10 | 0.10 | 0.10 | 0.10 | 0.10 | 0.10 | 0.10 | 0.10 |
| pure water | | balance | balance | balance | balance | balance | balance | balance | balance | balance |
| Total (% by mass) | | 100 | 100 | 100 | 100 | 100 | 100 | 100 | 100 | 100 |

The abbreviations described in Table 3 mean the following:
1: (the number of carboxyl groups: 1)
2: (the number of carboxyl groups: 2)
3: (the number of carboxyl groups: 2)
L-lactic acid: produced by Tokyo Chemical Industry Co., Ltd.; purity: 85% or higher; the number of carbon atoms: 3
L(+)-tartaric acid: produced by Kanto Kagaku K.K.; purity: 99.5% or higher; the number of carbon atoms: 4
DL-malic acid: produced by Kanto Kagaku K.K.; purity: 99% or higher; the number of carbon atoms: 5
ZONYL FS-300: produced by Dupont; polyoxyethylene perfluoroalkyl ether; amount of effective ingredient: 40% by mass
KF-643: produced by Shin-Etsu Chemical Co., Ltd.; polyether-modified silicone surfactant; ingredient amount: 100% by mass
FTERGENT 251: produced by Neos Co., Ltd.; branched perfluoroalkenyl-group-containing fluorosurfactant; amount of effective ingredient: 100% by mass
PROXEL GXL: antifungal agent containing 1,2-benzisothiazolin-3-one as the main component (produced by Avecia Inc., amount of effective ingredient: 20% by mass, dipropylene glycol is contained)

Physical properties of pre-treatment liquids of Preparation Examples 10 to 18 are shown in Table 4. Note that the ratio of organic amine to organic acid was calculated using the following equation.

Ratio of amine to organic acid=The number of moles of water-soluble organic monoamine compound/The number of moles of water-soluble aliphatic organic acid×The number of acid groups contained per molecule of water-soluble aliphatic organic acid

TABLE 4

| | Ratio of organic amine/organic acid | pH | Static surface tension (mN/m) |
|---|---|---|---|
| Preparation Ex. 10 | 1.2 | 8.11 | 52.6 |
| Preparation Ex. 11 | 1.0 | 7.41 | 22.8 |
| Preparation Ex. 12 | 1.0 | 7.55 | 22.4 |
| Preparation Ex. 13 | 1.4 | 8.72 | 21.6 |
| Preparation Ex. 14 | 1.0 | 7.69 | 23.5 |
| Preparation Ex. 15 | 1.0 | 7.83 | 24.3 |
| Preparation Ex. 16 | — | 3.01 | 21.6 |
| Preparation Ex. 17 | — | 7.04 | 55.2 |
| Preparation Ex. 18 | 0.0 | 1.80 | 22.2 |

Preparation Examples 19 to 25

Production of Protective-Layer-Forming Liquid

Materials such as a water-dispersible resin, each in an amount shown in Table 5 below, were mixed and stirred for 1 hour to obtain a uniform mixture liquid. The obtained mixture liquid was pressure filtered through a polyvinylidene fluoride membrane filter having an average pore size diameter of 5.0 μm so as to remove coarse particles and dust therefrom, thereby producing protective-layer-forming liquids of Preparation Examples of 19 to 25.

TABLE 5

| Component (% by mass) | | Preparation Examples | | | | | | |
|---|---|---|---|---|---|---|---|---|
| | | 19 | 20 | 21 | 22 | 23 | 24 | 25 |
| Water-dispersible resin | LUMIFLON FE4500 | 92.31 | | | | | | |
| | POLYZOL ROY6312 | | 62.50 | | | | | |
| | HYDRAN HW-930 | | | 50.00 | | | | |
| | BONCOAT 9455 | | | | 97.50 | | | |
| | BONCOAT BC-280 | | | | | 50.00 | | |
| | VINYBRAN 2580 | | | | | | 97.78 | |
| | VINYBRAN 2586 | | | | | | | 97.78 |
| Water-soluble organic solvent | 1,3-butanediol | | 20.00 | 20.00 | | 20.00 | | |
| | 3-methyl-1,3-butanediol | | | 5.00 | | | | |
| | Glycerin | | 15.00 | 15.00 | | 15.00 | | |
| Penetrant | 2-ethyl-1,3-hexanediol | | 1.00 | 1.00 | | 1.00 | | |
| Surfactant | SOFTANOL EP-7025 | | 1.00 | 1.00 | | 1.00 | | |
| | BYK-380N | 0.577 | | | 0.962 | | 0.962 | 0.962 |
| Antifungal agent | PROXEL GXL | 0.05 | 0.05 | 0.05 | 0.05 | 0.05 | 0.05 | 0.05 |
| Anti-foaming agent | Silicone-based antifoaming agent KM-72F | | 0.05 | 0.05 | | 0.05 | | |
| pH adjustor | 2-amino-2-ethyl-1,3-propanediol | | 0.20 | 0.20 | | 0.20 | | |
| pure water | | rest | rest | rest | rest | rest | rest | rest |
| Total (% by mass) | | 100 | 100 | 100 | 100 | 100 | 100 | 100 |

The abbreviations described in Table 5 mean the following:
LUMIFLON FE4500: produced by Asahi Glass Co., Ltd.; fluorine resin emulsion; solid content: 52% by mass; minimum filming temperature (MFT)=28° C.; glass transition temperature (Tg): 18° C. to 23° C.
POLYZOL ROY6312: produced by Showa High Polymer Co., Ltd.; acryl-silicone resin emulsion, solid content: 40% by mass; minimum filming temperature (MFT)=20° C.; glass transition temperature (Tg): 8° C.
HYDRAN HW-930: produced by Dainippon Ink Chemical Industries Co., Ltd.; polyester-based urethane resin emulstion; solid content: 50% by mass; minimum filming temperature (MFT)=0° C. or lower; softening temperature: 115° C. to 120° C.
BONCOAT 9455: produced by Dainippon Ink Chemical Industries Co., Ltd.; styrene-acrylic resin emulsion; solid content: 40% by mass; minimum filming temperature (MFT) =38° C. to 46° C.; glass transition temperature (Tg): 29° C.
BONCOAT BC-280: produced by Dainippon Ink Chemical Industries Co., Ltd.; acrylic resin emulsion; solid content: 50% by mass; minimum filming temperature (MFT)=0° C. to 3° C., glass transition temperature (Tg): 2° C.
VINYBRAN 2580: Nisshin Chemical Co., Ltd.; acrylic resin emulsion; solid content: 45% by mass; minimum filming temperature (MFT)=100° C. or higher; glass transition temperature (Tg): 100° C.
VINYBRAN 2586: Nisshin Chemical Co., Ltd.; styrene-acrylic resin emulsion; solid content: 45% by mass; minimum filming temperature (MFT)=0° C. or lower; glass transition temperature (Tg): −33° C.
SOFTANOL EP-7025: produced by Nippon Shokubai Co., Ltd.; polyoxyalkylene alkylene ether; amount of effective ingredient: 100% by mass
BYK-380N: produced by BYK Chemie Japan Co., Ltd.; leveling agent of acrylic-based copolymer; amount of effective ingredient: 52% by mass
PROXEL GXL: produced by Avecia Inc.; antifungal agent containing 1,2-benzisothiazolin-3-one as the main component; amount of effective ingredient: 20% by mass; dipropylene glycol is contained
KM-72F: produced by Shin-Etsu silicone Corp.; self-emulsified silicone antifoaming agent; amount of effective ingredient: 100% by mass <Formation of Image>

—Pre-Treatment Step (Examples 1 to 10, Comparative Examples 1 to 8)—

Each of the pre-treatment liquids of Preparation Examples 10 to 18 was applied to the recording medium shown in Tables 6-1 and 6-2 with a wet coating amount shown in Tables 6-1 and 6-2 by roll coating and then naturally dried, so that the pre-treatment was carried out.

—Ink-Jetting Step (Examples 1 to 10, Comparative Examples 1 to 8)—

Under the environment where the temperature and relative humidity were adjusted to 23° C.±2° C. and 50%±15%, respectively, in an inkjet printer IPSIO GX5000 (manufactured by Ricoh Company Ltd.), the drive voltage of piezo element was varied so as to uniformly discharge an ink and to make the ink adhere in the same amount to a recording medium. Next, the pint mode of the inkjet printer was set to the "Gloss Paper_Fine", and the recording medium and the inkset described in Tables 6-1 and 6-2 were used to form an image. Thereafter, the formed image was dried with hot air and fixed as a first step.

—Post-Treatment Step (Examples 1 to 10, Comparative Examples 2, 5, and 6)—

Each of the post-treatment liquids was applied to the image-formed recording medium and then dried with hot air. In addition, the formed image was smoothly fixed with a heat fixing roller as necessary. Note that in the case of the post-treatment liquids of Comparative Examples 3 and 4, an ink was not fixed on the recording medium in the ink-jetting step, and it was impossible to form a protective layer on the recording medium.

TABLE 6-1

| | Recording medium | Liquid transition amount 100 ms ml/m² | Pre-treatment step Pre-treatment liquid | Pre-treatment step Wet coating amount g/m² | Ink jetting step Ink set | Post-treatment step Post-treatment liquid | Post-treatment step Dry coating amount g/m² | Post-treatment step Heat fixing |
|---|---|---|---|---|---|---|---|---|
| Ex. 1 | Offset printing paper 1 | 3.0 | Preparation Ex. 10 | 1.6 | Production Ex. 1-4 | Preparation Ex. 20 | 1.6 | Not provided |
| Ex. 2 | Offset printing paper 1 | 3.0 | Preparation Ex. 11 | 1.6 | Production Ex. 1-4 | Preparation Ex. 20 | 1.6 | Provided |
| Ex. 3 | Offset printing paper 1 | 3.0 | Preparation Ex. 12 | 0.8 | Production Ex. 5-8 | Preparation Ex. 19 | 1.6 | Not provided |
| Ex. 4 | Offset printing paper 2 | 1.9 | Preparation Ex. 13 | 0.8 | Production Ex. 1-4 | Preparation Ex. 21 | 1.6 | Not provided |
| Ex. 5 | Offset printing paper 3 | 1.9 | Preparation Ex. 14 | 0.8 | Production Ex. 1-4 | Preparation Ex. 22 | 1.6 | Not provided |
| Ex. 6 | Offset printing paper 4 | 2.8 | Preparation Ex. 15 | 0.8 | Production Ex. 5-8 | Preparation Ex. 23 | 1.6 | Provided |
| Ex. 7 | Offset printing paper 5 | 7.0 | Preparation Ex. 12 | 0.8 | Production Ex. 5-8 | Preparation Ex. 24 | 1.6 | Not provided |
| Ex. 8 | JULIET paper | 5.8 | Preparation Ex. 15 | 0.8 | Production Ex. 5-8 | Preparation Ex. 25 | 1.6 | Not provided |
| Ex. 9 | Gravure printing paper | 9.9 | Preparation Ex. 11 | 1.6 | Production Ex. 1-4 | Preparation Ex. 20 | 1.6 | Not provided |

TABLE 6-2

| | Recording medium | Liquid transition amount 100 ms ml/m² | Pre-treatment step Pre-treatment liquid | Pre-treatment step Wet coating amount g/m² | Ink jetting step Ink set | Post-treatment step Post-treatment liquid | Post-treatment step Dry coating amount g/m² | Post-treatment step Heat fixing |
|---|---|---|---|---|---|---|---|---|
| Ex. 10 | Offset printing paper 1 | 3.0 | Preparation Ex. 18 | 0.8 | Production Ex. 1-4 | Preparation Ex. 20 | 1.6 | Not provided |
| Comp. Ex. 1 | Offset printing paper 1 | 3.0 | — | — | Production Ex. 1-4 | — | — | — |
| Comp. Ex. 2 | Offset printing paper 1 | 3.0 | — | — | Production Ex. 1-4 | Preparation Ex. 20 | 1.6 | Not provided |
| Comp. Ex. 3 | Offset printing paper 1 | 3.0 | Preparation Ex. 16 | 0.8 | Production Ex. 1-4 | — | — | — |
| Comp. Ex. 4 | Offset printing paper 1 | 3.0 | Preparation Ex. 17 | 0.8 | Production Ex. 1-4 | — | — | — |
| Comp. Ex. 5 | Offset printing paper 6 | 0.2 | Preparation Ex. 12 | 0.8 | Production Ex. 1-4 | Preparation Ex. 21 | 1.6 | Not provided |
| Comp. Ex. 6 | Inkjet printing paper | 33.5 | Preparation Ex. 15 | 0.8 | Production Ex. 1-4 | Preparation Ex. 22 | 1.6 | Not provided |
| Comp. Ex. 7 | Offset printing paper 1 | 3.0 | Preparation Ex. 11 | 1.6 | Production Ex. 1-4 | — | — | — |
| Comp. Ex. 8 | PPC paper | 11.5 | Preparation Ex. 11 | 1.6 | Production Ex. 1-4 | — | — | — |

In the case of the combinations of an ink and a pre-treatment liquid described in Table 6, the inks of Comparative Examples 1 and 2 did not aggregate.

The abbreviations described in Tables 6-1 and 6-2 mean the following:

Offset printing paper 1: produced by Oji Paper Co., Ltd.; OK TOPCOAT+, Grade A2
Offset printing paper 2: produced by Oji Paper Co., Ltd.; OK KINFUJI+, Grade A1
Offset printing paper 3: produced by Oji Paper Co., Ltd.; SA KINJUJI+, Grade A0
Offset printing paper 4: produced by Nippon Paper Industries Co., Ltd.; AURORACOAT, Grade A2
Offset printing paper 5: produced by Nippon Paper Industries Co., Ltd.; SUPER MI DULL, Grade A2
Offset printing paper 6: produced by Oji Paper Co., Ltd.; MIRRORCOAT PLATINUM, cast coat paper
Gloss paper: produced by Ricoh Company Ltd.; RICOH BUSINESS COAT GLOSS 100; Grade A2
Gravure printing paper: produced by Nippon Paper Industries Co., Ltd.; SPACE DX Inkjet exclusive paper: produced by SEIKO EPSON Corp., Super Fine Paper
PPC paper: produced by Ricoh Company Ltd.; Type 6200

Next, the image density, image color saturation, image glossiness and smear adhesion of Examples 1 to 10 and Comparative Examples 1 to 8 were evaluated in the following manners. The evaluation results are shown in Table 7. Note that the above-mentioned physical properties were evaluated for each color ink, based on the following evaluation criteria. Consequently, as for the results of each image quality, the most frequent grade was described in Table 7. If there were the same number of evaluation grades, a more favorable grade was described. Since it was impossible to provide post-treatment to Comparative Examples 3 and 4, the smear adhesion and degree of glossiness were not evaluated.

TABLE 7

| | Evaluation Result | | | | | |
|---|---|---|---|---|---|---|
| | Image density | Color saturation | Beading | Color bleeding | Smear adhesion | Glossiness |
| Ex. 1 | A | A | A | A | A | B |
| Ex. 2 | A | A | A | A | A | A |
| Ex. 3 | A | A | A | A | A | B |
| Ex. 4 | A | A | A | A | A | A |
| Ex. 5 | A | A | A | A | A | B |
| Ex. 6 | A | A | A | A | A | B |
| Ex. 7 | A | A | A | A | A | B |
| Ex. 8 | A | A | A | A | A | B |
| Ex. 9 | A | A | A | A | A | C |
| Ex. 10 | A | A | A | A | A | B |
| Comp. Ex. 1 | A | A | D | C | A | B |
| Comp. Ex. 2 | A | A | D | C | A | A |
| Comp. Ex. 3 | — | — | A | A | — | — |
| Comp. Ex. 4 | — | — | A | A | — | — |
| Comp. Ex. 5 | A | A | D | C | D | A |
| Comp. Ex. 6 | D | C | A | A | A | D |
| Comp. Ex. 7 | B | B | A | A | B | D |
| Comp. Ex. 8 | D | C | A | A | A | D |

* The symbol "—" in Table 7 means that the corresponding physical properties could not be measured.

In Table 7, the evaluated grades of "Beading" and "Color bleeding" also serve as the evaluation results of "aggregation of ink" when the ink and the pre-treatment liquid are used in combination.

<Image Density>

A chart, formed using Microsoft Word 2000 (by Microsoft Corporation) with a 64 point symbol "■" was printed on each of the recording media, followed by drying with hot air. The chromaticity of the symbol "■" portion on the print surface was measured by an X-RITE 939 and evaluated based on the following criteria. The print mode used according to the following evaluation criteria was set to "Gloss Paper & Fine" mode and "No Color-Correction" mode with a driver in the printer.

[Evaluation Criteria 1] . . . "Gloss Paper & Fine Mode"
  A: Black: 2.0 or higher, Yellow: 1.25 or higher, Magenta: 2.0 or higher, Cyan: 2.0 or higher
  B: Black: 1.9 or higher and lower than 2.0, Yellow: 1.2 or higher and lower than 1.25, Magenta: 1.9 or higher and lower than 2.0, Cyan: 1.9 or higher and lower than 2.0
  C: Black: 1.8 or higher and lower than 1.9, Yellow: 1.15 or higher and lower than 1.2, Magenta: 1.8 or higher and lower than 1.9, Cyan: 1.8 or higher and lower than 1.9
  D: Black: lower than 1.8, Yellow: lower than 1.15, Magenta: lower than 1.8, Cyan: lower than 1.8

<Image Color Saturation>

A chart similar to that used in the evaluation of image density described above was printed on each of the recording media, followed by drying with hot air. The chromaticity of the symbol "■" portion on the print surface was measured by an X-RITE 939. The print mode used according to the following evaluation criteria was set to "Gloss Paper & Fine" mode and "No Color-Correction" mode with a driver in the printer. A ratio of a color saturation value of standard color (Japan color ver. 2) to a degree of color saturation measured for (Yellow: 91.34, Magenta: 74. 55, Cyan: 62.82) was calculated and evaluated based on the following evaluation criteria.

[Evaluation Criteria 1] . . . "Gloss Paper & Fine Mode"
  A: 1.0 or higher
  B: 0.9 or higher and lower than 1.0
  C: lower than 0.9

<Beading>

Solid images of cyan, magenta, and green were each printed on a printing paper and then dried with hot air. Whether uneven image density (beading) was present in the printed image was observed and evaluated according to the following evaluation criteria.

[Evaluation Criteria]
  A: There was no portion of uneven image density.
  B: A slight uneven image density was observed.
  C: There were many portions of uneven image density were observed.
  D: There were numerous portions of significantly uneven image density.

<Color Bleeding>

On the recording medium, color line images of magenta, cyan and black each having a width of 0.5 mm were formed on a yellow solid image, followed by drying with hot air. Then, the color line images were visually observed to determine whether bleeding of color ink occurred at a color boundary portion where different colors of recording liquids were adjacent, i.e. occurrence of color bleeding. Similarly, the color bleeding was also observed in case of color line images of yellow, magenta and black each having a width of 0.5 mm formed on a cyan solid image, and color line images of yellow, cyan and black each having a width of 0.5 mm formed on a magenta solid image.

[Evaluation Criteria]
  A: No problem.
  B: Color bleeding slightly occurred but no problem occurred.
  C: Color bleeding was occurred and problem occurred.

<Image Glossiness>

A chart, formed using Microsoft Word 2000 (by Microsoft Corporation), with a single color solid image (3 cm×3 cm) was printed on each of the recording media, followed by drying with hot air. Then, a 60 degree glossiness of the symbol "■" portion on the print surface was measured by a glossmeter (4501, manufactured by BYK Gardener). The print mode used according to the following evaluation criteria was set to "Gloss Paper & Fine" mode and "No Color-Correction" mode with a driver in the printer.

[Evaluation Criteria 1] . . . "Gloss Paper & Fine Mode"
  A: 50 or higher
  B: 30 or higher and lower than 50
  C: 15 or higher and lower than 30
  D: lower than 15

49

<Smear Adhesion>

A chart, formed using Microsoft Word 2000 (by Microsoft Corporation), with a single color solid image (3 cm×3 cm) was printed on each of the recording media, followed by drying at a temperature of 23° C.±2° and a relative humidity of 50%±15% for 24 hours. Then, the solid image on the print surface was rubbed back and forth 10 times with a cotton cloth No. 3 (conforming to JIS L0803) attached to a CM-1 Model clockmeter using a pressure-sensitive adhesive double coated tape, and the cotton cloth was rubbed against the print portion and moved back and forth 10 times. Then, the amount of transferred ink from the solid image to that cotton was measured using X-Rite 938 (manufactured by X-Rite Co.). The original color of that cotton was eliminated for obtaining the density of smear. Based on the measured amount, the density of the transferred ink on the cotton cloth was obtained and evaluated according to the following criteria.

[Evaluation Criteria 1] . . . "Gloss Paper & Fine Mode"
  A: less than 0.05
  B: 0.05 or more and less than 0.1
  C: 0.1 or more and less than 0.15 (practically usable level)
  D: 0.15 or more

INDUSTRIAL APPLICABILITY

An image recording method and an image formed matter according to the present invention can be used in various types of recording employing an inkjet recording system, and is, suitably used as an alternate of low-volume offset printing.

REFERENCE SIGNS LIST 1 pre-treatment liquid
2 film thickness control roller
3 scoop roller
4 ink-feeding roller
5 counter roller
6 recording material
7 paper feed roller
8 paper feed tray
10 recording material pressing roller
11, 12, 13, 14, 15, 16 recording material feed roller
17 recording material
18 paper feed roller
20 recording head
21 ink cartridge
22 carriage shaft
23 carriage
31 recording material guide
32, 33 recording material feed roller
34 recording material return guide
35 conveyance path switching guide

The invention claimed is:

1. An image forming method, comprising:
  applying a pre-treatment liquid, capable of aggregating a water-dispersible colorant, onto a surface of a coating layer on a surface of a support of a recording medium,
  jetting an inkjet ink onto the surface of the coating layer, onto which the pre-treatment liquid has been applied, thereby forming an image, and
  applying or jetting a post-treatment liquid onto the surface of the coating layer, onto which the inkjet ink has been jetted, thereby forming a transparent protective layer on the coating layer,
  wherein the inkjet ink comprises the water-dispersible colorant, a water-soluble organic solvent, a surfactant, a penetrant, and water,

50 an amount of pure water transferred into the coating layer on the surface of the recording medium is from 1 mL/m$^2$ to 10 mL/m$^2$ measured at a contact time of 100 ms with a dynamic scanning liquid absorptometer, and
  the pre-treatment liquid comprises a water-soluble aliphatic organic acid.

2. The image forming method of claim 1, wherein a number of carbon atoms of the water-soluble aliphatic organic acid is from 2 to 6.

3. The image forming method of claim 1,
  wherein the water-soluble aliphatic organic acid comprises at least one compound of a formula selected from the group consisting of Formulae (I), (II), and (III):

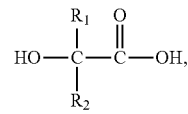

Formula (I)

wherein $R_1$ is a hydrogen atom or a methyl group substituted by a hydroxyl group or carboxyl group and $R_2$ is a methyl group or a methyl group substituted by a hydroxyl group or carboxyl group;

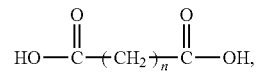

Formula (II)

wherein n is an integer of from 0 to 4; and

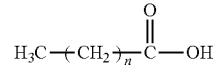

Formula (III)

wherein n is an integer of from 0 to 4.

4. The image forming method of claim 1, wherein the pre-treatment liquid further comprises a water-soluble organic monoamine compound.

5. The image forming method of claim 4, wherein the water-soluble organic monoamine compound comprises at least one compound of a formula selected from the group consisting of Formulae (IV) and (V):

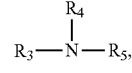

Formula (IV)

wherein $R_3$, $R_4$, and $R_5$ are each independently a hydrogen atom, an alkoxy group comprising from 1 to 4 carbon atoms, an alkyl group comprising from 1 to 8 carbon atoms, a hydroxyethyl group, or a hydroxypropyl group, with the proviso that $R_3$, $R_4$, and $R_5$ are not all hydrogen atoms and

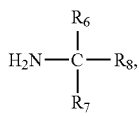

Formula (V)

wherein $R_6$ is a hydroxymethyl group;

$R_7$ is a methyl group, an ethyl group, or a hydroxymethyl group; and $R_8$ is a hydrogen atom, an alkyl group comprising from 1 to 4 carbon atoms, or a hydroxymethyl group.

6. The image forming method of claim 1, wherein a static surface tension of the pre-treatment liquid is 30 mN/m or lower.

7. The image forming method of claim 1, wherein the water-dispersible colorant is a pigment, and the pigment comprises an anionic self-dispersible pigment, a pigment coated with an anionic resin, or both.

8. The image forming method of claim 1, wherein a static surface tension of the inkjet ink is 30 mN/m or lower.

9. The image forming method of claim 1, wherein the post-treatment liquid comprises a thermoplastic resin.

10. The image forming method of claim 9, wherein the thermoplastic resin is a water-dispersible resin with a glass transition temperature (Tg) of −30° C. or higher and a minimum film forming temperature (MFT) of 50° C. or lower.

11. The image forming method of claim 10, wherein the water-dispersible resin is at least one resin selected from the group consisting of an acrylic resin, a styrene-acrylic resin, a urethane resin, an acryl-silicone resin, and a fluorine resin.

12. The image forming method of claim 1, wherein a dry adhesion amount of the post-treatment liquid to the recording medium is from 0.5 g/m² to 10 g/m².

13. The image forming method of claim 1, further comprising:

heating the recording medium, onto which the post-treatment liquid has been applied or jetted, at 100° C. to 150° C. by a heating unit, thereby thermally fixing the inkjet ink on the recording medium.

14. The image forming method of claim 1, wherein a wet coating amount of the pre-treatment liquid applied to the surface of the coating layer is from 0.1 g/m² to 30.0 g/m².

15. The image forming method of claim 14, wherein the wet coating amount of the pre-treatment liquid applied to the surface of the coating layer is from 0.2 g/m² to 10.0 g/m².

16. The image forming method of claim 1, wherein the water-soluble aliphatic acid comprises an organic acid comprising a sulfo group.

17. The image forming method of claim 16, wherein the water-soluble aliphatic acid comprises taurine.

18. The image forming method of claim 1, wherein the water-soluble organic solvent comprises a polyhydric alcohol, a polyhydric alcohol alkyl ether, a polyhydric alcohol aryl ether, a nitrogen-containing heterocyclic compound, an amide, an amine, a sulfur-containing compound, propylene carbonate, ethylene carbonate, or a mixture thereof.

19. The image forming method of claim 1, wherein an equilibrium water content of the water-soluble organic solvent is 30% by mass or more at 23° C. and 80% relative humidity.

* * * * *